US009549314B2

(12) United States Patent
Ode

(10) Patent No.: US 9,549,314 B2
(45) Date of Patent: **\*Jan. 17, 2017**

(54) WIRELESS COMMUNICATION SYSTEM AND WIRELESS TERMINAL DEVICE

(75) Inventor: Takayoshi Ode, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/356,195

(22) Filed: Jan. 23, 2012

(65) Prior Publication Data

US 2012/0122409 A1    May 17, 2012

Related U.S. Application Data

(60) Division of application No. 12/437,827, filed on May 8, 2009, which is a continuation of application No. PCT/JP2006/322494, filed on Nov. 10, 2006.

(51) Int. Cl.
*H03J 7/02* (2006.01)
*H04W 8/22* (2009.01)
(Continued)

(52) U.S. Cl.
CPC ............ *H04W 8/22* (2013.01); *H04W 72/0406* (2013.01); *H04W 8/24* (2013.01); *H04W 72/048* (2013.01)

(58) Field of Classification Search
CPC .......................... H04W 8/22; H04W 72/0406
(Continued)

(56) References Cited

U.S. PATENT DOCUMENTS 5,914,950 A * 6/1999 Tiedemann, Jr. ....... H04L 47/10
 370/335
5,940,391 A * 8/1999 Malkin ................. H04L 12/185
 370/390

(Continued)

FOREIGN PATENT DOCUMENTS

CN    1732677    2/2006
EP    1427131    6/2004
(Continued)

OTHER PUBLICATIONS

Final Office Action issued by the United States Patent and Trademark Office for corresponding U.S. Appl. No. 13/356,186, electronically delivered on May 6, 2013.
(Continued)

*Primary Examiner* — Hai V Nguyen
(74) *Attorney, Agent, or Firm* — Myers Wolin, LLC

(57) ABSTRACT

A wireless communication system corresponding to a wireless terminal device in which at least one of a first frequency bandwidth for use in an up link and a second frequency bandwidth for use in a down link is variable, including a capability information reception unit capable of receiving and extracting terminal capability information transmitted from the wireless terminal device and related to capability of the wireless terminal device; a category designation unit capable of designating a terminal category to which the wireless terminal device belongs, based on the terminal capability information received and extracted by the capability information reception unit; and a link setting unit capable of setting a link to the wireless terminal device and transmitting a control signal depending on the link setting to the wireless terminal device, based on the terminal category designated by the category designation unit.

8 Claims, 19 Drawing Sheets

(51) Int. Cl.
  *H04W 72/04* (2009.01)
  *H04W 8/24* (2009.01)
(58) Field of Classification Search
  USPC .......................................................... 455/71
  See application file for complete search history.

(56) References Cited

U.S. PATENT DOCUMENTS

| | | | | |
|---|---|---|---|---|
| 6,307,867 B1* | 10/2001 | Roobol | ................ | H04J 3/1647 370/342 |
| 6,341,145 B1* | 1/2002 | Hioe | ................... | H04L 1/0007 375/231 |
| 6,356,607 B1* | 3/2002 | Scott | ................... | H04B 1/7093 370/509 |
| 6,389,068 B1* | 5/2002 | Smith | ................... | H04L 1/0015 370/468 |
| 6,757,270 B1* | 6/2004 | Kumar | ................. | H04W 52/12 370/342 |
| 6,865,165 B1 | 3/2005 | Huttunen | | |
| 7,054,633 B2* | 5/2006 | Seo | ....................... | H04W 52/16 370/331 |
| 7,146,172 B2* | 12/2006 | Li | ......................... | H04L 1/0003 455/447 |
| 7,158,810 B2* | 1/2007 | Schwarz | .............. | H04W 28/18 455/552.1 |
| 7,433,334 B2* | 10/2008 | Marjelund | .............. | H04W 8/22 370/329 |
| 7,532,578 B2* | 5/2009 | Hanaki | ................ | H04L 12/1836 370/252 |
| 7,599,339 B2* | 10/2009 | Rudolf | ............. | H04W 72/1278 370/329 |
| 7,620,396 B2* | 11/2009 | Floam | .................. | H04W 24/00 455/418 |
| 7,680,215 B2* | 3/2010 | Lindoff | ................. | H04B 1/001 370/331 |
| 7,693,543 B2* | 4/2010 | Schwarz | .............. | H04W 28/18 455/450 |
| 7,720,023 B2* | 5/2010 | Bais | ................. | H04L 29/06027 370/328 |
| 7,733,849 B2 | 6/2010 | Usuba et al. | | |
| 7,787,412 B2* | 8/2010 | Vadgama | ............. | H04L 47/14 370/320 |
| 7,805,508 B1* | 9/2010 | Jones | ..................... | H04L 12/66 709/218 |
| 7,813,328 B2* | 10/2010 | Rudolf | ............. | H04W 72/1278 370/329 |
| 7,826,850 B2* | 11/2010 | Matoba | ................ | H04L 5/0005 455/450 |
| 7,859,986 B2* | 12/2010 | Laroia | ................. | H04L 5/0039 370/208 |
| 8,036,162 B2* | 10/2011 | Suzuki | .................... | H04B 1/406 370/328 |
| 8,107,425 B2* | 1/2012 | de Bruin | ............... | H04L 1/0006 370/252 |
| 8,121,106 B2* | 2/2012 | Furuskar | ............... | H04L 5/1484 370/295 |
| 8,125,946 B2* | 2/2012 | Csapo | ................. | H04B 7/2634 370/329 |
| 8,125,960 B2* | 2/2012 | Iwamura | ........... | H04W 36/0022 370/331 |
| 8,130,705 B2* | 3/2012 | Bhattacharjee | ...... | H04W 72/005 370/236 |
| 8,213,374 B2* | 7/2012 | Harada | ................ | H04W 76/048 370/329 |
| 8,243,665 B2* | 8/2012 | Lee | ...................... | H04W 28/20 370/329 |
| 8,270,351 B2* | 9/2012 | Rudolf | ............ | H04W 72/1278 370/328 |
| 8,320,359 B2* | 11/2012 | Lindoff | ............... | H04J 11/0069 370/350 |
| 8,514,335 B2* | 8/2013 | Murakami | ................ | H04N 5/38 348/723 |
| 8,792,443 B2* | 7/2014 | Bhattacharjee | ..... | H04W 72/005 370/236 |
| 8,838,046 B2* | 9/2014 | Fu | .......................... | H04B 1/406 455/67.13 |
| 8,886,239 B2* | 11/2014 | Dayal | ............... | H04W 72/1221 455/423 |
| 8,913,536 B2* | 12/2014 | Futaki | ............... | H04W 36/0055 370/311 |
| 8,923,213 B2* | 12/2014 | Ode | ........................ | H04W 8/22 370/329 |
| 8,942,633 B2* | 1/2015 | Ko | ....................... | H04W 76/023 455/448 |
| 8,983,448 B2* | 3/2015 | Jang | ...................... | H04W 36/20 370/338 |
| 9,131,522 B2* | 9/2015 | Behnamfar | ......... | H04W 72/1257 |
| 9,131,523 B2* | 9/2015 | HomChaudhuri | | H04W 72/1257 |
| 9,326,128 B2* | 4/2016 | Ode | ........................ | H04W 8/22 |
| 2002/0003798 A1* | 1/2002 | Sato | ...................... | H04L 1/0003 370/390 |
| 2002/0071480 A1* | 6/2002 | Marjelund | .............. | H04W 8/22 375/141 |
| 2002/0147017 A1* | 10/2002 | Li | .......................... | H04L 1/0003 455/447 |
| 2003/0018753 A1* | 1/2003 | Seki | .................... | H04L 12/2803 709/219 |
| 2003/0058871 A1* | 3/2003 | Sastry | ................. | H04L 12/5693 370/401 |
| 2003/0076173 A1* | 4/2003 | Moller | .................... | H01L 23/48 330/295 |
| 2004/0106430 A1* | 6/2004 | Schwarz | ............... | H04W 28/18 455/552.1 |
| 2004/0160955 A1* | 8/2004 | Hanaki | .............. | H04L 12/1836 370/390 |
| 2004/0171351 A1* | 9/2004 | Nakazawa | ............. | H04B 17/20 455/67.13 |
| 2004/0179484 A1* | 9/2004 | Nakazawa | ........... | H04B 17/345 370/278 |
| 2004/0203759 A1* | 10/2004 | Shaw | ....................... | H04W 8/18 455/433 |
| 2005/0043030 A1* | 2/2005 | Shariat | .................... | H04W 4/18 455/449 |
| 2005/0220002 A1 | 10/2005 | Li et al. | | |
| 2005/0250469 A1* | 11/2005 | Laroia | ................. | H04L 5/0039 455/403 |
| 2005/0271009 A1 | 12/2005 | Shirakabe et al. | | |
| 2006/0045093 A1* | 3/2006 | Choi | ................... | H04L 12/5693 370/395.4 |
| 2006/0056346 A1* | 3/2006 | Vadgama | ................ | H04L 47/14 370/329 |
| 2006/0063533 A1 | 3/2006 | Matoba et al. | | |
| 2006/0063543 A1 | 3/2006 | Matoba et al. | | |
| 2006/0178145 A1* | 8/2006 | Floam | .................. | H04W 24/00 455/434 |
| 2006/0198450 A1* | 9/2006 | Cheng | ................. | H04L 1/0003 375/260 |
| 2006/0221926 A1* | 10/2006 | Maekawa | ............. | H04W 92/02 370/345 |
| 2006/0234716 A1* | 10/2006 | Vesterinen | ............ | H04W 28/20 455/450 |
| 2006/0274712 A1 | 12/2006 | Malladi et al. | | |
| 2007/0041347 A1* | 2/2007 | Beale | .................. | H04W 48/10 370/335 |
| 2007/0072614 A1* | 3/2007 | Forsberg | ............... | H04W 36/30 455/436 |
| 2007/0093253 A1* | 4/2007 | Lindoff | ................ | H04J 11/0069 455/450 |
| 2007/0110004 A1 | 5/2007 | Liu et al. | | |
| 2007/0183451 A1* | 8/2007 | Lohr | ...................... | H04L 1/1678 370/473 |
| 2007/0191041 A1* | 8/2007 | Chapin | ................ | H04W 52/346 455/509 |
| 2007/0237261 A1* | 10/2007 | Lindoff | ................. | H04B 1/001 375/316 |
| 2007/0248184 A1* | 10/2007 | Plevridis | ............ | H04L 27/361 375/296 |

(56) References Cited

U.S. PATENT DOCUMENTS

| | | | |
|---|---|---|---|
| 2007/0263709 A1* | 11/2007 | Kasslin | H04W 88/06 375/222 |
| 2007/0264994 A1* | 11/2007 | Schwarz | H04W 28/18 455/422.1 |
| 2007/0275713 A1 | 11/2007 | Tidwell | |
| 2007/0291728 A1* | 12/2007 | Dalsgaard | H04L 12/12 370/347 |
| 2008/0069046 A1* | 3/2008 | Ishii | H04L 12/5693 370/330 |
| 2008/0109841 A1* | 5/2008 | Heather | G06Q 30/02 725/32 |
| 2008/0109851 A1* | 5/2008 | Heather | G06Q 30/0603 725/60 |
| 2008/0205365 A1* | 8/2008 | Russell | H04W 88/06 370/341 |
| 2008/0219275 A1* | 9/2008 | Boariu | H04W 8/005 370/401 |
| 2008/0248824 A1* | 10/2008 | Fukui | H04W 72/1289 455/509 |
| 2008/0318527 A1* | 12/2008 | Higuchi | H04B 1/707 455/42 |
| 2009/0010211 A1 | 1/2009 | Sumasu et al. | |
| 2009/0010219 A1* | 1/2009 | Lee | H04W 28/20 370/329 |
| 2009/0011792 A1* | 1/2009 | van Rooyen | H04H 20/24 455/552.1 |
| 2009/0081962 A1* | 3/2009 | Sohrabi | H04W 72/1242 455/79 |
| 2009/0088177 A1* | 4/2009 | Yang | H04W 16/14 455/452.2 |
| 2009/0116434 A1* | 5/2009 | Lohr | H04L 5/0007 370/329 |
| 2009/0135787 A1* | 5/2009 | Uemura | H04W 24/10 370/335 |
| 2009/0147748 A1* | 6/2009 | Ofuji | H04J 11/0026 370/330 |
| 2009/0213806 A1* | 8/2009 | Ode | H04W 8/22 370/329 |
| 2009/0227214 A1* | 9/2009 | Georgantas | H04B 1/30 455/86 |
| 2009/0245171 A1* | 10/2009 | Suzuki | H04B 1/406 370/328 |
| 2009/0318087 A1* | 12/2009 | Mattila | H04B 1/109 455/63.1 |
| 2010/0002608 A1* | 1/2010 | Goldhamer | H04B 7/026 370/280 |
| 2010/0002648 A1* | 1/2010 | Rudolf | H04W 72/1278 370/329 |
| 2010/0034108 A1* | 2/2010 | Ode | H04W 72/02 370/252 |
| 2010/0035624 A1* | 2/2010 | Tseng | H04W 76/048 455/450 |
| 2010/0037114 A1* | 2/2010 | Huang | H04L 1/1829 714/749 |
| 2010/0069112 A1* | 3/2010 | Sun | H04W 74/085 455/553.1 |
| 2010/0098135 A1* | 4/2010 | Eitan | H04B 1/109 375/141 |
| 2010/0128825 A1* | 5/2010 | Lindoff | H04B 1/001 375/344 |
| 2010/0157791 A1* | 6/2010 | Casaccia | H04L 1/0045 370/216 |
| 2010/0165894 A1* | 7/2010 | Furuskar | H04L 5/1484 370/281 |
| 2010/0197235 A1* | 8/2010 | Wilhelmsson | H04W 52/243 455/63.3 |
| 2010/0214966 A1* | 8/2010 | Hu | H04W 72/085 370/311 |
| 2010/0215004 A1* | 8/2010 | Yoo | H04L 1/0031 370/329 |
| 2010/0227639 A1* | 9/2010 | Kim | H04B 1/005 455/525 |
| 2010/0322287 A1* | 12/2010 | Truong | H04W 72/1215 375/133 |
| 2011/0009136 A1* | 1/2011 | Mantravadi | H04W 88/06 455/501 |
| 2011/0026479 A1* | 2/2011 | Rudolf | H04W 72/1278 370/329 |
| 2011/0103314 A1* | 5/2011 | Ahmadi | H04W 8/22 370/329 |
| 2011/0105176 A1* | 5/2011 | Van Rooyen | H04H 20/57 455/550.1 |
| 2011/0235612 A1* | 9/2011 | Abeta | H04W 72/1215 370/329 |
| 2011/0235621 A1* | 9/2011 | Ko | H04W 72/1215 370/338 |
| 2011/0256834 A1* | 10/2011 | Dayal | H04W 16/14 455/67.7 |
| 2011/0256884 A1* | 10/2011 | Kazmi | H04W 48/04 455/456.1 |
| 2011/0261772 A1* | 10/2011 | Iwamura | H04W 28/20 370/329 |
| 2011/0268024 A1* | 11/2011 | Jamp | H04W 16/14 370/328 |
| 2011/0310800 A1* | 12/2011 | Lin | H04W 28/14 370/328 |
| 2011/0312288 A1* | 12/2011 | Fu | H04B 1/406 455/88 |
| 2012/0014476 A1* | 1/2012 | Kuchi | H04B 7/024 375/296 |
| 2012/0020229 A1* | 1/2012 | Dayal | H04W 16/14 370/252 |
| 2012/0020231 A1* | 1/2012 | Chen | H04W 36/08 370/252 |
| 2012/0040620 A1* | 2/2012 | Fu | H04B 1/1027 455/63.1 |
| 2012/0082140 A1* | 4/2012 | Lin | H04W 72/1215 370/336 |
| 2012/0120896 A1* | 5/2012 | Ode | H04W 8/22 370/329 |
| 2012/0120897 A1* | 5/2012 | Ode | H04W 8/22 370/329 |
| 2012/0147797 A1* | 6/2012 | Furuskar | H04L 5/1484 370/281 |
| 2012/0184316 A1* | 7/2012 | Ode | H04W 28/20 455/509 |
| 2012/0207040 A1* | 8/2012 | Comsa | H04W 72/1215 370/252 |
| 2012/0243450 A1* | 9/2012 | Ishii | H04L 5/0007 370/281 |
| 2012/0243473 A1* | 9/2012 | Kadous | H04W 72/1215 370/328 |
| 2012/0257551 A1* | 10/2012 | Diao | H04W 72/048 370/280 |
| 2012/0270557 A1* | 10/2012 | Ahluwalia | H04W 76/048 455/450 |
| 2012/0281563 A1* | 11/2012 | Comsa | H04W 24/10 370/252 |
| 2012/0294169 A1* | 11/2012 | Chui | H04W 52/0274 370/252 |
| 2012/0300631 A1* | 11/2012 | Zee | H04W 76/025 370/235 |
| 2012/0314628 A1* | 12/2012 | Rudolf | H04W 72/1278 370/280 |
| 2013/0012135 A1* | 1/2013 | Ruohonen | H04B 1/406 455/63.1 |
| 2013/0083753 A1* | 4/2013 | Lee | H04W 72/0453 370/329 |
| 2013/0090142 A1* | 4/2013 | Lee | H04B 1/0475 455/501 |
| 2013/0114473 A1* | 5/2013 | Awoniyi | H04W 24/10 370/280 |
| 2013/0150106 A1* | 6/2013 | Bucknell | H04W 16/14 455/501 |
| 2013/0172039 A1* | 7/2013 | Drucker | H04W 52/288 455/522 |
| 2013/0195058 A1* | 8/2013 | Ode | H04W 72/048 370/329 |

(56) References Cited

U.S. PATENT DOCUMENTS

| | | | | |
|---|---|---|---|---|
| 2013/0201848 A1* | 8/2013 | Kazmi | H04W 24/00 | 370/252 |
| 2013/0201883 A1* | 8/2013 | Wang | H04W 72/082 | 370/278 |
| 2013/0203432 A1* | 8/2013 | Wang | H04W 72/082 | 455/452.1 |
| 2013/0225068 A1* | 8/2013 | Kiminki | H04W 52/0216 | 455/39 |
| 2013/0235814 A1* | 9/2013 | Wietfeldt | H04W 16/14 | 370/329 |
| 2013/0242780 A1* | 9/2013 | Dayal | H04W 24/00 | 370/252 |
| 2013/0258869 A1* | 10/2013 | Zhou | H04W 52/243 | 370/252 |
| 2013/0272260 A1* | 10/2013 | Bitran | H04W 16/14 | 370/329 |
| 2013/0273857 A1* | 10/2013 | Zhang | H04B 15/00 | 455/73 |
| 2013/0301420 A1* | 11/2013 | Zhang | H04W 76/048 | 370/241 |
| 2014/0043979 A1* | 2/2014 | Etemad | H04B 7/2656 | 370/237 |
| 2014/0112298 A1* | 4/2014 | Oh | H04L 5/0092 | 370/329 |
| 2014/0126498 A1* | 5/2014 | Koorapaty | H04L 5/0098 | 370/329 |
| 2014/0235242 A1* | 8/2014 | Granzow | H04W 48/17 | 455/436 |
| 2015/0043363 A1* | 2/2015 | Koskinen | H04W 16/14 | 370/252 |
| 2015/0063145 A1* | 3/2015 | Jactat | H04W 24/02 | 370/252 |
| 2015/0071179 A1* | 3/2015 | Zhang | H04W 52/04 | 370/329 |
| 2015/0245394 A1* | 8/2015 | Sharma | H04W 48/16 | 455/434 |
| 2015/0365221 A1* | 12/2015 | Jones | H04B 7/2643 | 370/280 |

FOREIGN PATENT DOCUMENTS

| | | |
|---|---|---|
| EP | 1 753 179 A1 | 2/2007 |
| JP | 08-275230 | 10/1996 |
| JP | 2000-069544 | 3/2000 |
| JP | 2000-175254 | 6/2000 |
| JP | 2002-077229 | 3/2002 |
| JP | 2004-537875 | 12/2004 |
| JP | 2005-341432 | 12/2005 |
| JP | 2006-94005 | 4/2006 |
| JP | 2006-217173 | 8/2006 |
| JP | 2006-287754 | 10/2006 |
| KR | 10-2004-0052480 | 6/2004 |
| KR | 10-2004-0079659 | 9/2004 |
| WO | 00/54536 | 9/2000 |
| WO | 02/49306 A3 | 6/2002 |
| WO | 03/040866 | 5/2003 |
| WO | 2004/004407 | 1/2004 |
| WO | 2004/079948 | 9/2004 |
| WO | 2005/109787 A1 | 11/2005 |
| WO | 2006/082761 | 10/2006 |
| WO | 2006/109492 | 10/2006 |

OTHER PUBLICATIONS

Notice of Preliminary Rejection issued for corresponding Korean Patent Application No. 10-2011-7008335, mailed Oct. 29, 2012, with English translation.
The State Intellectual Property Office of China "2nd Notification of Office Action" issued for corresponding Chinese Patent Application No. 200680056322.1, issued Jun. 29, 2011. English translation attached.
Japanese Patent Office "Notice of Rejection Grounds" issued for corresponding Japanese Patent Application No. 2008-542979, mailed Aug. 30, 2011. English translation attached.
International Search Report and written opinion for corresponding International Application No. PCT/JP2006/322494 dated Feb. 6, 2007.
3GPP TS 25.101 V7.4.0 (Jun. 2006); 3rd Generation Partnership Project; Technical Specification Group Radio Access Network; User Equipment (UE) radio transmission and reception (FDD) (Release 7); Sophia Antipolis, Valbonne, France; dated Jun. 2006.
3GPP TS 25.306 V6.8.0 (Mar. 2006); 3rd Generation Partnership Project; Technical Specification Group Radio Access Network; UE Radio Access capabilities (Release 6); Sophia Antipolis, Valbonne, France; dated Mar. 2006.
3GPP TS 25.331 V6.10.0 (Jun. 2006) 3rd Generation Partnership Project; Technical Specification; Radio Resource Control protocol for the UE-UTRAN radio interface (Release 6); dated Jun. 2006.
Non-Final Office Action issued by the United States Patent and Trademark Office for corresponding U.S. Appl. No. 12/437,827 electronically delivered Jun. 19, 2013.
Notice of Final Rejection issued for corresponding Korean Patent Application No. 10-2011-7008335, mailed May 31, 2013, with full English translation.
Final Office Action issued by the United States Patent and Trademark Office for corresponding U.S. Appl. No. 13/356,171, electronically delivered on May 1, 2013.
Non-Final Office Action issued by the United States Patent and Trademark Office for corresponding U.S. Appl. No. 13/356,171, mailed Nov. 21, 2012.
Final Office Action issued by the United States Patent and Trademark Office for corresponding U.S. Appl. No. 12/437,827 electronically delivered Aug. 9, 2012.
Notice of Preliminary Rejection issued for corresponding Korean Patent Application No. 10-2012-7014258 mailed Jul. 19, 2012 with English translation.
Notice of Final Rejection issued for corresponding Korean Patent Application No. 10-2012-7014258, mailed Jan. 31, 2013, with English translation.
Official Action issued by Russian Patent Office for corresponding Russian Application 2011101563/07, undated.
Extended European search report, including supplementary European search report and European search opinion, issued for corresponding European Patent Application No. 06823316.2, dated Nov. 26, 2012.
Australian Office Action issued for corresponding Australian Patent Application No. 2012202258, issued on Sep. 6, 2013.
Canadian Office Action issued by the Canadian Intellectual Property Office for corresponding Patent Application No. 2,668,705 mailed on Nov. 8, 2013.
Final Office Action issued by the United States Patent and Trademark Office for corresponding U.S. Appl. No. 12/437,827, issued Dec. 4, 2013.
Notice of Rejection Ground (Japanese Office Action) issued for corresponding Japanese Patent Application No. 2011-239338, mailed Jul. 23, 2013 with full English translation.
Non-Final Office Action issued by the United States Patent and Trademark Office for corresponding U.S. Appl. No 13/356,171, issued Sep. 18, 2013.
First Notification of Office Action issued for corresponding Chinese Patent Application No. 201210111666.5, issued on Feb. 24, 2014, with an English translation.
First Office Action issued by the Patent Office of the Russian Federation for corresponding Russian Patent Application No. 2012151154, issued on Apr. 29, 2014, with an English translation.
Fourth Notification of Office Action issued for corresponding Chinese Patent Application No. 201110135683.8, issued on Apr. 24, 2014, with an English translation.
First Office Action issued for corresponding Australian Patent Application No. 2012211425, issued on Feb. 26, 2014.
First Office Action issued for corresponding India Patent Application No. 1679/KOLNP/2009, issued on Mar. 14, 2014.

(56) References Cited

OTHER PUBLICATIONS

Final Office Action issued by the United States Patent and Trademark Office for corresponding U.S. Appl. No. 13/356,171, electronically mailed on Mar. 12, 2014.
ETSI, "Universal Mobile Telecommunications System (UMTS); Radio Resource Control (RCC) protocol specification (3GPP TS 25.331 version 7.0.0 Release 7)", Mar. 2006, ETSI TS 125 331 V7.0.0 (Mar. 2006), Sophia Antipolis Cedex, France.
Ericsson et al., "UE Capability on Supportable Bandwidths", Agenda Item: 8.2, Nov. 7-11, 2005, R1-051309, TSG-RAN WG1 #43, 3GPP, Seoul, Korea.
Notice of Preliminary Rejection issued for corresponding Korean Patent Application No. 10-2012-7014258, mailed Aug. 25, 2014, with an English translation.
Huawei Technologies Co., Ltd., "LTE Protocols and Procedures" Issue 06, dated Mar. 1, 2006.
Office Action issued for corresponding European Patent Application No. 06823316.2 dated Nov. 11, 2014.
Non-Final Office Action issued by the United States Patent and Trademark Office for corresponding U.S. Appl. No. 13/356,171, electronically delivered on Apr. 3, 2015.
Non-Final Office Action issued by the United States Patent and Trademark Office for corresponding U.S. Appl. No. 13/356,171, electronically delivered on Oct. 14, 2014.
Office Action issued by the Canadian Intellectual Property Office for corresponding Canadian Patent Application No. 2,787,127, dated Oct. 26, 2015.
Office Action issued for corresponding Canadian Patent Application No. 2,668,705 issued on Feb. 19, 2016.
Extended European search report or the partial European search report/ declaration of no search and the European search opinion issued for corresponding European Patent Application No. 15159042.9 dated Jun. 22, 2015.
Office Action issued by Rospatent Federal Service for Intellectual Property for corresponding Russian Patent Application No. 2011101563/07(001985), mailed on Dec. 26, 2011, with an English translation.
Non-Final Office Action issued by the United States Patent and Trademark Office for corresponding U.S. Appl. No. 12/437,827, electronically delivered on Feb. 6, 2012.
Office Action issued for corresponding Canadian Patent Application No. 2,900,236 issued on Jul. 25, 2016.

\* cited by examiner

| Information Element/Group name | Need | Multi | Type and reference | Semantics description |
|---|---|---|---|---|
| CHOICE mode | MP | | | |
| >FDD | | | | |
| >>UARFCN uplink (Nu) | OP | | Integer(0..16383) | If this IE is not present, the default duplex distance defined for the operating frequency band shall be used |
| >>UARFCN downlink (Nd) | MP | | Integer(0..16383) | |

RELATED ART

F I G. 1

| Band | UARFCN formula offset Ful_offset [MHz] | UPLINK (UL) UE transmit, Node B receive | | | | UARFCN formula offset Fdl_offset [MHz] | DOWNLINK (DL) UE receive, Node B transmit | | | | UL/DL difference | REMARKS |
|---|---|---|---|---|---|---|---|---|---|---|---|---|
| | | Carrier frequency(Ful) range [MHz] | | | | | Carrier frequency(Fdl) range [MHz] | | | | | |
| | | Ful_low | Ful_center | Ful_high | band width | | Fdl_low | Fdl_center | Fdl_high | band width | | |
| i | 0 | 1920.0 | 1950.0 | 1980.0 | 60.0 | 0.0 | 2110.0 | 2140.0 | 2170.0 | 60.0 | 190.0 | Core Band |
| ii | 0 | 1850.0 | 1880.0 | 1910.0 | 60.0 | 0.0 | 1930.0 | 1960.0 | 1990.0 | 60.0 | 80.0 | UMTS1900 (EU) |
| iii | 1525 | 1710.0 | 1747.5 | 1785.0 | 75.0 | 1575.0 | 1805.0 | 1842.5 | 1880.0 | 75.0 | 95.0 | UMTS1800 (US) |
| iv | 1450 | 1710.0 | 1732.5 | 1755.0 | 45.0 | 1805.0 | 2110.0 | 2132.5 | 2155.0 | 45.0 | 400.0 | UMTS 1.7/2.1 (EU) |
| v | 0 | 824.0 | 836.5 | 849.0 | 25.0 | 0.0 | 869.0 | 881.5 | 894.0 | 25.0 | 45.0 | UMTS850 (US) |
| vi | 0 | 830.0 | 835.0 | 840.0 | 10.0 | 0.0 | 875.0 | 880.0 | 885.0 | 10.0 | 45.0 | UMTS800 (JP) |
| vii | 2100 | 2500.0 | 2535.0 | 2570.0 | 70.0 | 2175.0 | 2620.0 | 2655.0 | 2690.0 | 70.0 | 120.0 | UMTS2600 (EU) |
| viii | 340 | 880.0 | 897.5 | 915.0 | 35.0 | 340.0 | 925.0 | 942.5 | 960.0 | 35.0 | 45.0 | UMTS900 (EU) |
| ix | 0 | 1749.9 | 1767.4 | 1784.9 | 35.0 | 0.0 | 1844.9 | 1862.4 | 1879.9 | 35.0 | 95.0 | UMTS1700 (JP) |

RELATED ART
F I G. 2

| HS-DSCH category | Maximum number of HS-DSCH codes received | Minimum inter-TTI interval | Maximum number of bits of an HS-DSCH transport block received within an HS-DSCH TTI | Total number of soft channel bits |
|---|---|---|---|---|
| Category 1 | 5 | 3 | 7298 | 19200 |
| Category 2 | 5 | 3 | 7298 | 28800 |
| Category 3 | 5 | 2 | 7298 | 28800 |
| Category 4 | 5 | 2 | 7298 | 38400 |
| Category 5 | 5 | 1 | 7298 | 57600 |
| Category 6 | 5 | 1 | 7298 | 67200 |
| Category 7 | 10 | 1 | 14411 | 115200 |
| Category 8 | 10 | 1 | 14411 | 134400 |
| Category 9 | 15 | 1 | 20251 | 172800 |
| Category 10 | 15 | 1 | 27952 | 172800 |
| Category 11 | 5 | 2 | 3630 | 14400 |
| Category 12 | 5 | 1 | 3630 | 28800 |

UEs of Categories 11 and 12 support QPSK only.

RELATED ART
F I G. 3

| E-DCH category | Maximum number of E-DCH codes transmitted | Minimum spreading factor | Support for 10 and 2 ms TTI EDCH | Maximum number of bits of an E-DCH transport block transmitted within a 10 ms E-DCH TTI | Maximum number of bits of an E-DCH transport block transmitted within a 2 ms E-DCH TTI |
|---|---|---|---|---|---|
| Category 1 | 1 | SF4 | 10 ms TTI only | 7110 | — |
| Category 2 | 2 | SF4 | 10 ms and 2 ms TTI | 14484 | 2798 |
| Category 3 | 2 | SF4 | 10 ms TTI only | 14484 | — |
| Category 4 | 2 | SF2 | 10 ms and 2 ms TTI | 20000 | 5772 |
| Category 5 | 2 | SF2 | 10 ms TTI only | 20000 | — |
| Category 6 | 4 | SF2 | 10 ms and 2 ms TTI | 20000 | 11484 |

NOTE: When 4 codes are transmitted in parallel, two codes shall be transmitted with SF2 and two with SF4

RELATED ART
F I G. 4

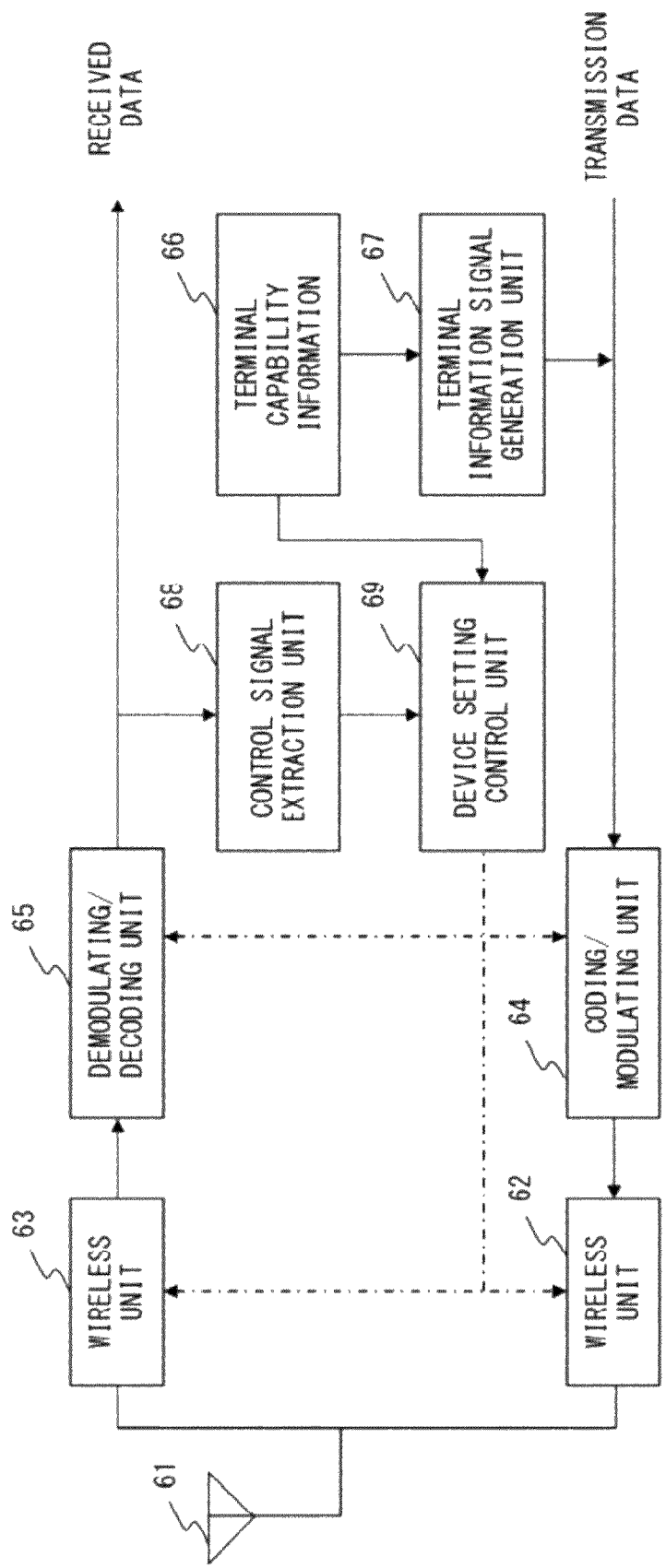
F I G. 6

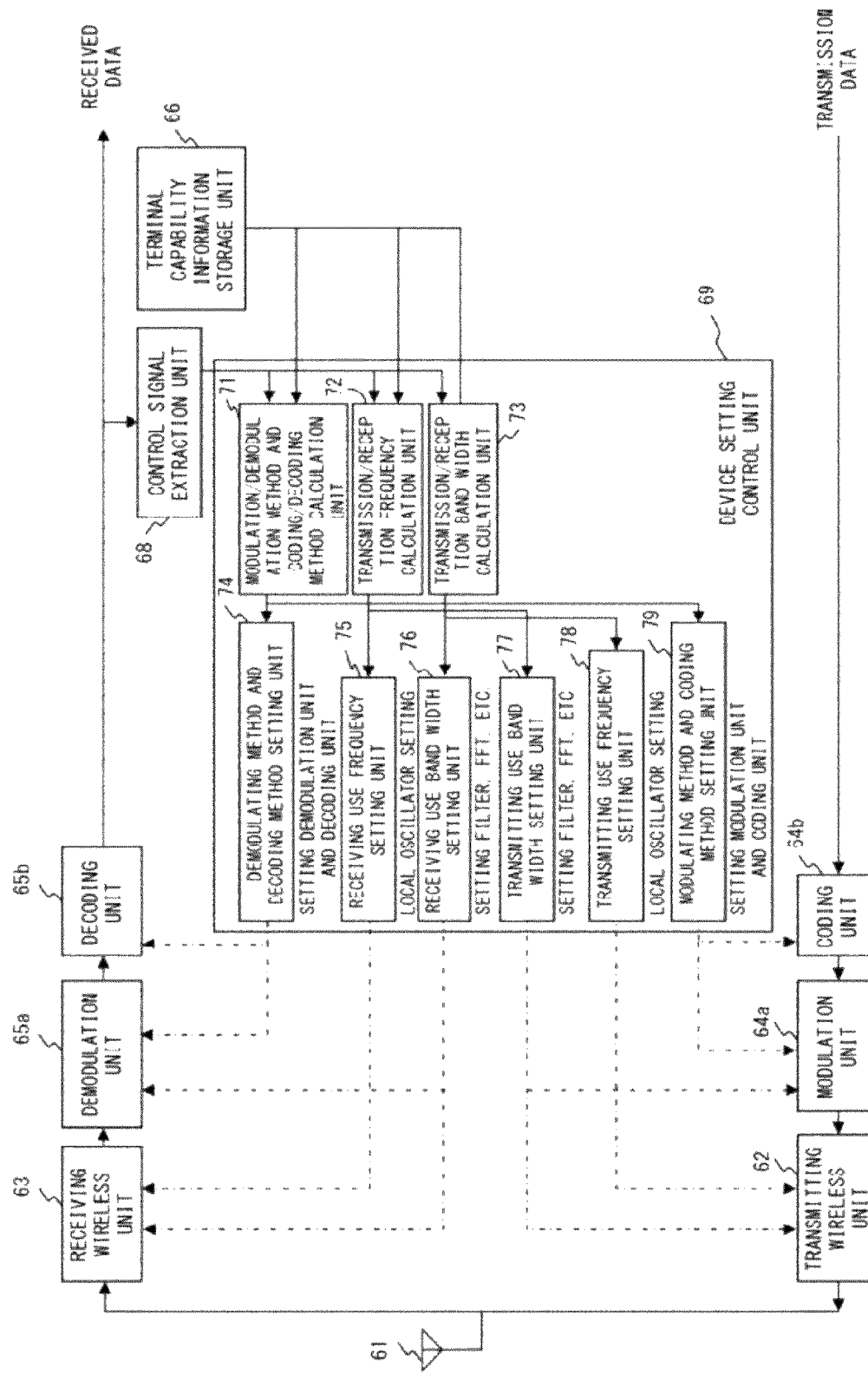
F I G. 7

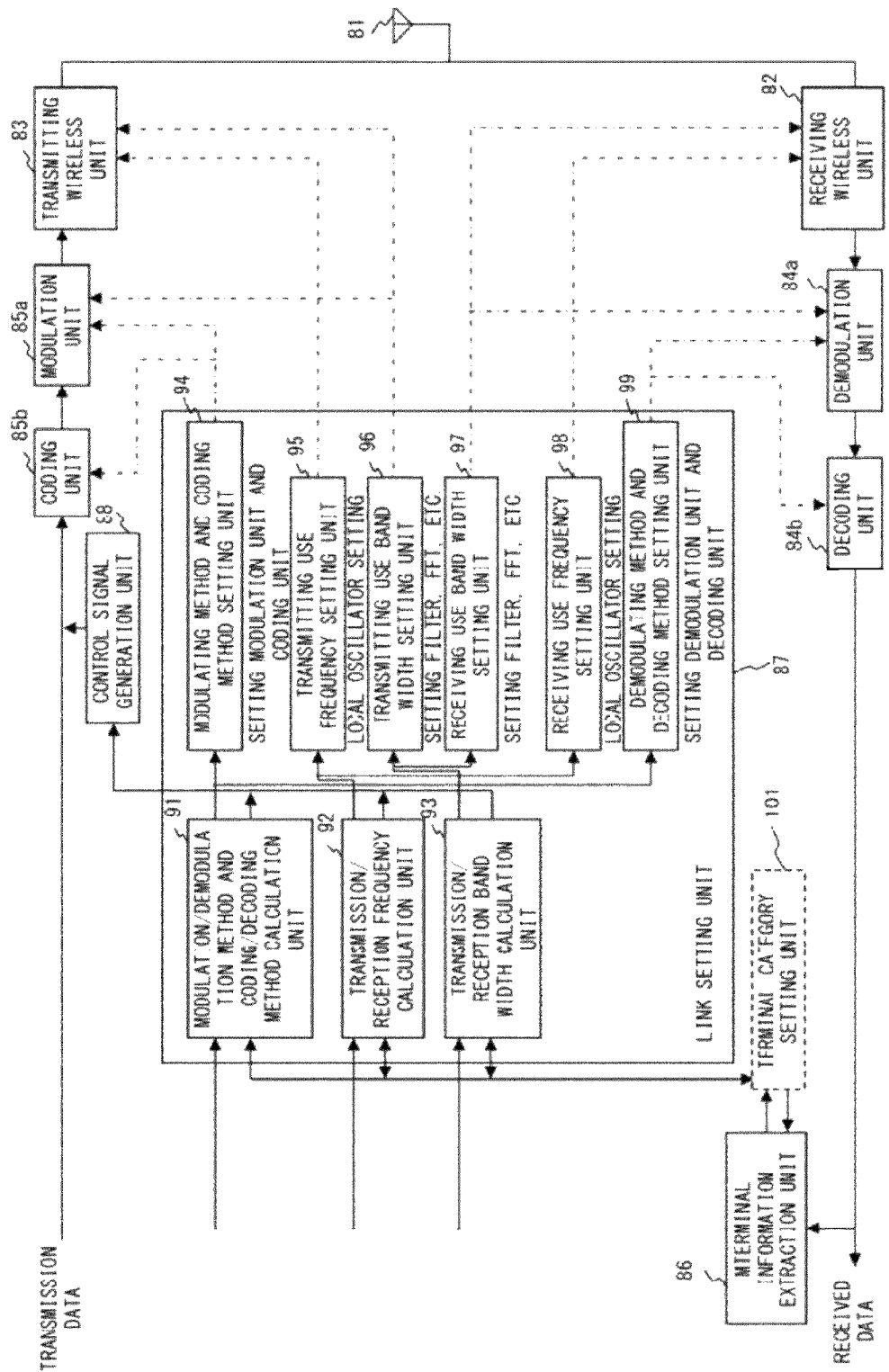
F I G. 9

| CATEGORY | MODULATION SYSTEM | DOWN LINK BANDWIDTH [MHz] | UP LINK BANDWIDTH [MHz] | MAXIMUM FREQUENCY DIFFERENCE [MHz] |
|---|---|---|---|---|
| 1 | QPSK, 16QAM | 5 | 1.25 | 512 |
| 2 | QPSK, 16QAM | 5 | 2.5 | 512 |
| 3 | QPSK, 16QAM | 5 | 5 | 512 |
| 4 | QPSK, 16QAM | 10 | 1.25 | 256 |
| 5 | QPSK, 16QAM | 10 | 2.5 | 256 |
| 6 | QPSK, 16QAM | 10 | 5 | 256 |
| 7 | QPSK, 16QAM, 64QAM | 20 | 1.25 | 128 |
| 8 | QPSK, 16QAM, 64QAM | 20 | 2.5 | 128 |
| 9 | QPSK, 16QAM, 64QAM | 20 | 5 | 128 |

FIG. 10

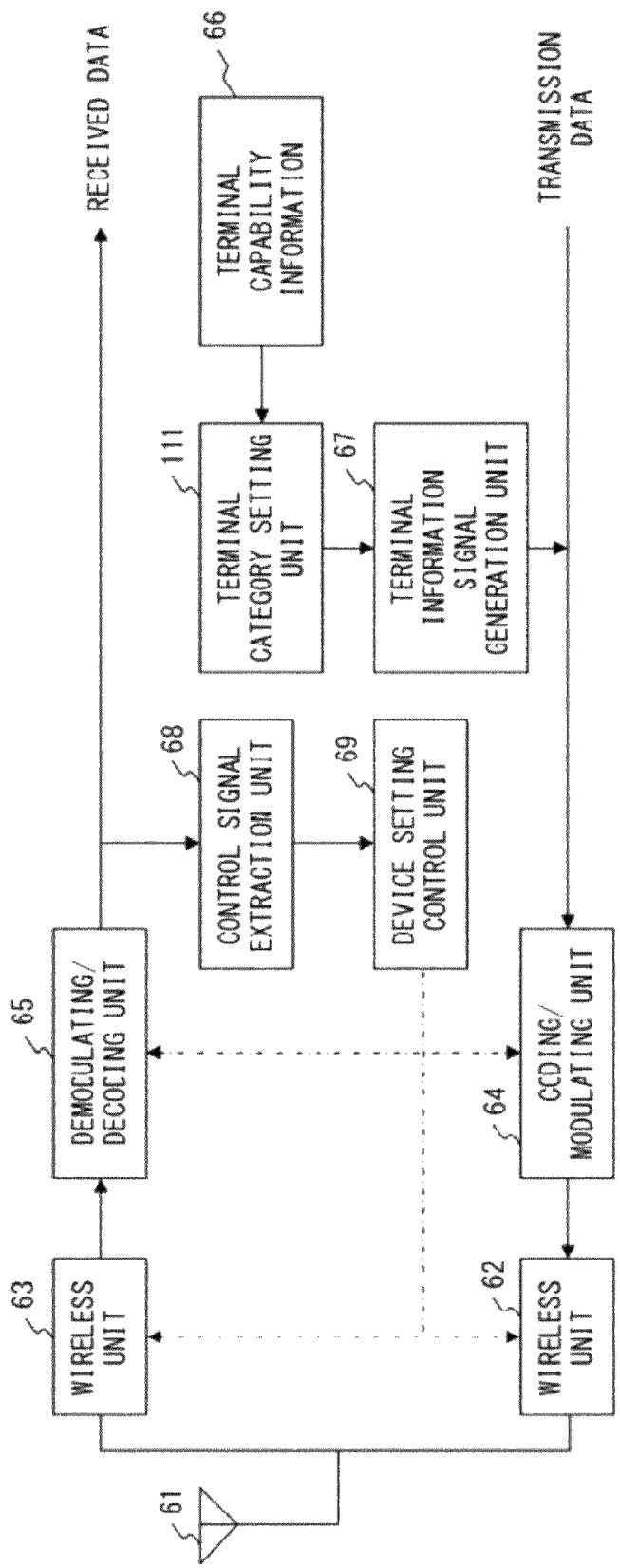
F I G. 11

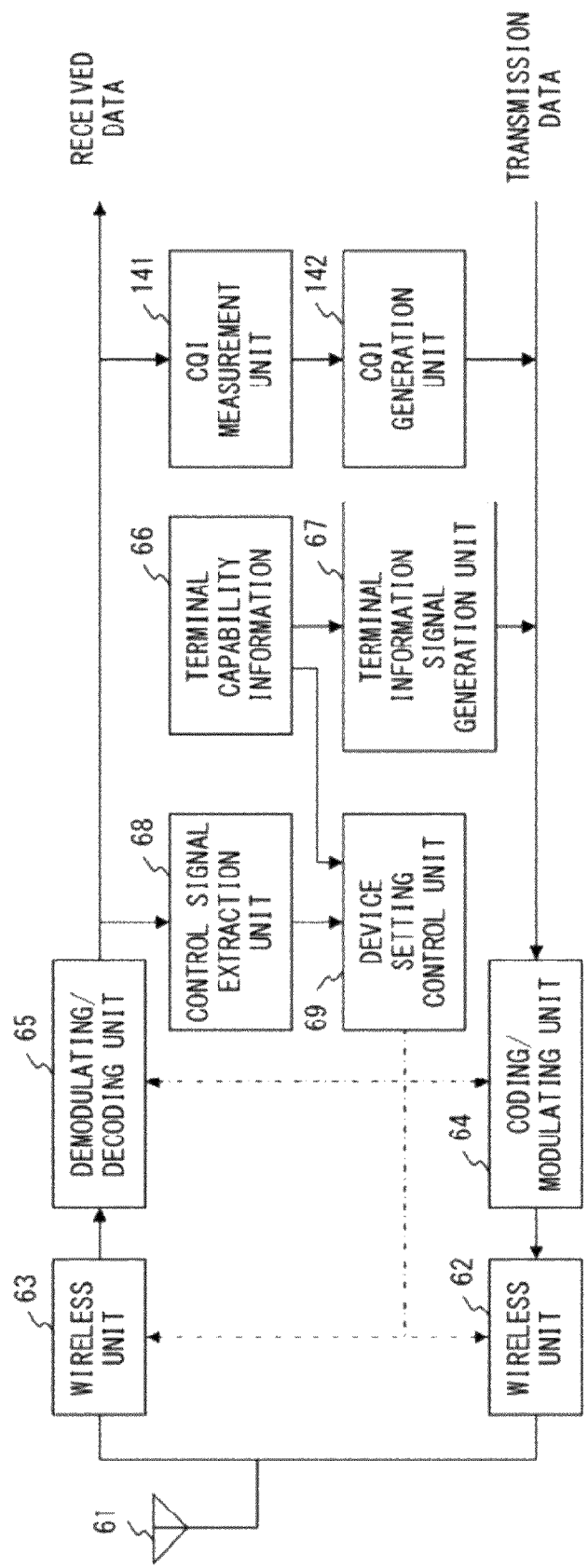
F I G. 14

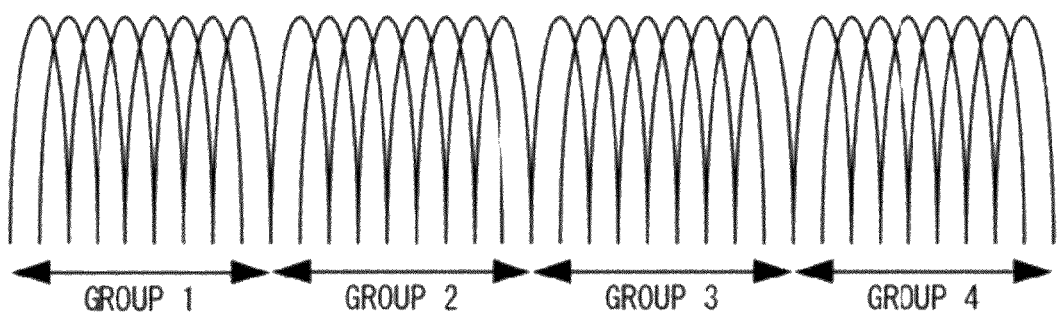
F I G. 17

| CATEGORY | MODULATION SYSTEM | DOWN LINK BANDWIDTH [MHz] | UP LINK BANDWIDTH [MHz] | MAXIMUM FREQUENCY DIFFERENCE [MHz] | MIMO TRANSMISSION | MIMO RECEPTION |
|---|---|---|---|---|---|---|
| 1 | QPSK, 16QAM | 5 | 1.25 | 512 | × | × |
| 2 | QPSK, 16QAM | 5 | 2.5 | 512 | × | × |
| 3 | QPSK, 16QAM | 5 | 5 | 512 | × | × |
| 4 | QPSK, 16QAM | 10 | 1.25 | 256 | × | × |
| 5 | QPSK, 16QAM | 10 | 2.5 | 256 | × | × |
| 6 | QPSK, 16QAM | 10 | 5 | 256 | × | × |
| 7 | QPSK, 16QAM, 64QAM | 20 | 1.25 | 128 | × | ○ |
| 8 | QPSK, 16QAM, 64QAM | 20 | 2.5 | 128 | × | ○ |
| 9 | QPSK, 16QAM, 64QAM | 20 | 5 | 128 | × | ○ |
| 10 | QPSK, 16QAM, 64QAM | 20 | 1.25 | 128 | ○ | ○ |
| 11 | QPSK, 16QAM, 64QAM | 20 | 2.5 | 128 | ○ | ○ |
| 12 | QPSK, 16QAM, 64QAM | 20 | 5 | 128 | ○ | ○ |

F I G. 1 8

WIRELESS COMMUNICATION SYSTEM AND WIRELESS TERMINAL DEVICE

CROSS REFERENCE TO RELATED APPLICATION

The present application is a divisional of U.S. application Ser. No. 12/437,827 filed on May 8, 2009, now pending, which is a continuation of international PCT application No. PCT/JP2006/322494 filed on Nov. 10, 2006, the contents of each are herein wholly incorporated by reference.

TECHNICAL FIELD

The present invention relates to the technology of wireless communications using a terminal device having at least one of a first frequency bandwidth for use in an up link and its central frequency and a second frequency bandwidth for use in an down link and its central frequency is variable.

BACKGROUND ART

Recently, a higher communication speed is demanded in the wireless communications. In a mobile communication service such as a mobile telephone etc., a high-speed broad band communication system has been studied at the demand or a higher speed communication. A W-CDMA (wideband-code division multiple access) system has been studied and standardized in a 3GPP (3rd generation partnership project) as one of the communication systems.

Described below is an example of the W-CDMA system. The W-CDMA system is configured by a terminal device (UE: user equipment) such as a mobile telephone, a vehicle-mounted telephone, etc., a plurality of wireless base station (node B) for communicating with the terminal device (hereinafter referred to as a "terminal"), and a radio network controller (RNC: radio network controller) for controlling the plurality of wireless base station (hereinafter referred to as "base station") (FIG. 5).

In the above-mentioned W-CDMA system, communications can be realized in a higher speed by broad bands using FDD (frequency division duplex) or TDD (time division duplex), and an independent frequency resource is respectively assigned to the up/down link in the FDD mode. The frequency band available for the uplink (up link frequency band), and the frequency band available for the downlink (down link frequency band) are regulated by laws (the Radio Law etc.). For example, in the service of the 2 GHz band provided in Japan, the bandwidths are fixed to 5.0 MHz, and the frequency difference between the up and down bands is 190 MHz constantly. Therefore, in the W-CDMA method using the W-CDMA system, when one of the up and down link frequency bands is selected, the other can be determined from the frequency difference. That is, a terminal is to be informed of the determined down link frequency (band) only.

FIG. 1 is an explanatory view of the frequency information transmitted and received between the base station and the terminal regulated in the non-patent document 3 as one of the specifications of the W-CDMA system. As illustrated in FIG. 1, a notification of the down link frequency information (represented as "UARFCN downlink (Nd)" in FIG. 1. UARFCN is short for UTRA absolute radio frequency channel number) to the mobile communication device is necessary (MP), and the up link frequency information (represented as "UARFCN uplink (Nu)" in FIG. 1) is optional (OP). When the frequency difference is not constant (fixed), a notification of the up link frequency information is required (MP). The down link frequency is determined by the radio network controller, and reported to the terminal through the base station.

Since the information about the up link frequency is Nu, the information about the down link frequency is Nd, and the setting range is 0 through 16383, 14 bits are required for the representation. Therefore, a 14-bit control signal is transmitted to the terminal.

The frequency information Nu, and Nd is regulated in the non-patent document 1, and generated by the following equations.

$$Nu = 5 \times (F_{UL} - F_{UL\_offset}) \quad (1)$$

$$Nd = 5 \times (F_{DL} - F_{DL\_offset}) \quad (2)$$

where $F_{UL}$ and $F_{DL}$ are determined frequencies, and $F_{UL\_offset}$ and $F_{DL\_offset}$ are offset frequencies regulated in FIG. 2. Therefore, FIG. 2 is an explanatory view of the frequency for each frequency band, and is a table described in the non-patent document 1 with additional columns of the central frequency of the up and down link bands and the difference between the up and down link frequencies.

The "i" through "ix" in FIG. 2 indicate the respective frequency band numbers. Thus, FIG. 2 illustrates the bands assigned to the uplink (UL: link transmitted from the terminal (UE) to the base station (node B)) and the downlink (DL: link transmitted from the base station to the terminal)) for each frequency band, and the frequency difference between the bands.

The frequency information Nu and Nd are calculated as follows by using the equations above when the up link frequency is 1922.4 MHz and the down link frequency is 2112.4 MHz.

$$Nu = 5 \times (F_{UL} - F_{UL\_offset}) = 5 \times (1922.4 - 0) = 9612 \quad (3)$$

$$Nd = 5 \times (F_{DL} - F_{DL\_offset}) = 5 \times (2112.4 - 0) = 10562 \quad (4)$$

In the W-CDMA system, the capability (terminal capability) of a terminal is categorized. A terminal capability refers to essential information for communications such as the number of wireless channels available for a broadcast. By classifying the capability into categories using the information, the capability can be more easily managed. For example, FIG. 3 is an explanatory view of categorizing the capability in the conventional HSDPA (high-speed downlink packet access) system described in the non-patent document 3, and FIG. 4 is an explanatory view of categorizing the capability in the HSUPA (high-speed uplink packet access) system described in the non-patent document 3. The HSDPA and the HSUPA systems are operated at a higher speed than the W-CDMA system. FIG. 3 illustrates for each category the determined maximum number of HS-DSCH (high-speed downlink shared channels) that can be simultaneously received, minimum transmission time interval (minimum inter-TTI interval) that can be intermittently received, maximum number of bits of the HS-DSCH transmission blocks, and total number of bits of soft channels. FIG. 4 illustrates for each category the determined maximum number of E-DCH (enhanced-dedicated channels) that can be simultaneously transmitted, minimum SF (spreading factor), transmitting time interval (TTI) (TTI is 10, and 2 ms) of the supported E-DCH, maximum number of bits of E-DCH transmission blocks transmitted at the TTI of 10 ms, and maximum number of bits of E-DCH transmission blocks transmitted at the TTI of 2 ms.

As described above, a category is inevitable information for appropriately perform communications between a base station and a terminal. Accordingly, category information (for example, a category number) or terminal capability information is notified from a terminal to a base station. The notification is reflected by the scheduling for selecting a communication partner and determining a transmitting method.

Recently proposed is a communication system having practically available frequency bandwidth (hereinafter referred to as an "up bandwidth") and down link frequency bandwidth (hereinafter referred to as a "down bandwidth") not only separate from each other but also variable depending on the terminal capability. For example, it is an E3G (evolved 3G also referred to as S3G (super 3G)) system studied for specifications in the 3GPP system.

The frequency difference between the up and down links in the E3G system depends on the assignment of each bandwidth and the central frequency of each band. Therefore, unlike the conventional W-CDMA system, it cannot automatically select the up link frequency by selecting the down link frequency. That is, the settings of the up and down frequencies are to be separately performed, thereby requiring a larger volume of necessary control information, complicating the controlling operation, and forcing the base station to notify the terminal of the control information about the up and down frequencies.

Since the frequency setting can be changed even during communications by a propagation environment, scheduling, etc., it is necessary to set a frequency at a high speed. To set a frequency at a high speed, it is important to realize at least one of the process of reducing the number of pieces of control information to be transmitted and received, or the process of simplifying the control. Since 14 bits are required for the notification of each of the frequency information Nu and Nd obtained by the equations (1) and (2) above, it is conventionally considered that the frequency information Nu and Nd are to be transmitted to the terminal by a smaller number of bits.

Patent Document 1: Japanese Laid-open Patent Publication No. 2005-341432
Patent Document 2: Japanese Laid-open Patent Publication No. 2000-69544
Patent Document 3: Japanese Laid-open Patent Publication No. 2000-175254
Non-patent Document 1: 3GPP TS 25.101 V7.4.0 (2006-06)
Non-patent Document 2: 3GPP TS 25.306 V6.8.0 (2006-06)
Non-patent Document 3: 3GPP TS 25.331 V6.10.0 (2006-06)

DISCLOSURE OF THE INVENTION

The present invention aims at providing the technology of setting a frequency at a high speed in wireless communications (mobile communications).

The first and second wireless communication systems according to the present invention are to communicate with a wireless terminal device (hereinafter referred to as a "terminal"), and each of the systems has the following devices.

The wireless communication system according to the first aspect includes a category designation unit for designating a terminal category using at least the transmitting frequency bandwidth and receiving frequency bandwidth available between the system and a wireless terminal device.

The wireless communication system according to the second aspect includes a category designation unit for designating a terminal category using a difference between a transmitting frequency and a receiving frequency available between the system and a wireless terminal device.

The wireless communication systems according to the third through fourteenth aspects correspond to a terminal in which at least one of a first frequency bandwidth (and its central frequency) for use in an up link and a second frequency bandwidth (and its central frequency) for use in a down link is variable, and each system includes the following units.

The terminal according to the first through fourth aspects is based on that at least one of a first frequency bandwidth (and its central frequency) for use in an up link and a second frequency bandwidth (and its central frequency) for use in a down link is variable, and includes the following units.

The wireless communication system according to the third aspect includes: a capability information reception unit for receiving and extracting terminal capability information transmitted from a terminal and related to the capability of the terminal; a category designation unit for designating a terminal category to which the terminal belongs, based on the terminal capability information received and extracted by the capability information reception unit; and a link setting unit for setting a link to the wireless terminal device and transmitting a control signal depending on the link setting to the wireless terminal device, based on the terminal category designated by the category designation unit.

The wireless communication system according to the fourth aspect includes: a capability information reception unit for receiving and extracting terminal capability information transmitted from a terminal and related to terminal capability; a category designation unit for designating a terminal category to which the terminal belongs, based on the terminal capability information received and extracted by the capability information reception unit; and a scheduling unit for scheduling on the basis of the terminal category designated by the category designation unit for selecting a terminal to communicate with from among the terminals.

The wireless communication system according to the fifth aspect includes: a category information reception unit for receiving and extracting terminal category information transmitted from a terminal and indicating a terminal category to which the terminal belongs; and a link setting unit for setting a link to the terminal according to the terminal category information received and extracted by the category information reception unit, and transmitting a control signal corresponding to the link setting to the terminal.

The wireless communication system according to the sixth aspect includes: a category information reception unit for receiving and extracting terminal category information transmitted from a terminal and indicating a terminal category to which the terminal belongs; and a scheduling unit for scheduling according to the terminal category information received and extracted by the category information reception unit for selecting a terminal to communicate with from among the terminals.

The wireless communication system according to the seventh aspect further includes in addition to the configuration according to an of the third through sixth aspects: a control signal transmission unit for generating a control signal indicating a frequency after a change of a frequency used in communications with a terminal using a frequency difference between frequencies before and after the change and notifying the terminal of the frequency after the change by transmitting the control signal to the terminal.

The wireless communication system according to the eighth aspect includes: a link setting unit for setting a link to a terminal; and a control signal transmission unit for generating a control signal using both one of a down link frequency indicating a down link frequency band and an up link frequency indicating an up link frequency band determined by the link setting unit determining the link setting, and another frequency represented by a frequency difference between the down link frequency and the up link frequency, and transmitting the signal to a wireless terminal device, thereby informing of the down link frequency and the up link frequency.

The terminal according to the first aspect is based on the wireless communication system of the eighth aspect. With the configuration, the terminal further includes: a control signal reception unit for receiving from the wireless communication system which communicates with the terminal the control signal generated and transmitted using both one of a down link frequency indicating a down link frequency band and an up link frequency indicating an up link frequency band determined by the wireless communication system, and another frequency represented by a frequency difference between the down link frequency and the up link frequency; and a device setting unit for designating the up link frequency and the down link frequency on the basis of the control signal received by the control signal reception unit, and setting a terminal.

The wireless communication system according to the ninth aspect includes: a link setting unit for setting a link to a terminal; and a control signal transmission unit for defining at least one of a down link frequency indicating a down link frequency band and an up link frequency indicating an up link frequency band determined by the link setting unit setting the link as a one frequency, by generating a control signal using reference frequency information indicating the reference frequency predetermined as a reference and a frequency difference between the reference frequency and the one frequency, and transmitting the signal to the wireless terminal device.

The wireless communication system according to the tenth aspect includes: a link setting unit for setting a link to a terminal; and a control signal transmission unit for generating a control signal using a frequency difference between at least one of a down link frequency indicating a down link frequency band and an up link frequency indicating an up link frequency band determined by the link setting unit setting the link as one frequency and a reference frequency defined as a reference in advance, and transmitting the signal to the terminal, thereby reporting the one frequency.

The terminal according to the second aspect is based on the wireless communication system of the ninth or tenth aspect, and includes: a control signal reception unit for receiving from the wireless communication system according to the ninth or tenth aspect the control signal generated and transmitted using reference frequency information indicating a reference frequency determined as a reference in advance, and a frequency difference between one of a down link frequency indicating a down link frequency band and an up link frequency indicating an up link frequency band determined by the wireless communication system as one frequency and the reference frequency; and a device setting unit for designating one frequency according to the control signal received by the control signal reception unit and setting a terminal.

The wireless communication system according to the eleventh aspect includes: a link setting unit for setting a link to a terminal by assuming subcarriers having different frequencies; and a control signal transmission unit for generating a control signal according to subcarrier information indicating a subcarrier belonging to at least one of a down link frequency band and an up link frequency band determined by the link setting when the link setting unit sets the link, transmitting the signal to the terminal, thereby notifying the terminal of the one frequency.

The wireless communication system according to the twelfth aspect includes: a scheduling unit for scheduling selecting a terminal to communicate with from among a plurality of terminals; and a control signal transmission unit for notifying the terminal selected by the scheduling unit by performing the scheduling using subcarriers having different frequencies at least one of down link frequency band and an up link frequency band determined by performing the scheduling as one frequency, by generating and transmitting a control signal using subcarrier information indicating a subcarrier belonging to the one frequency.

The terminal according to the third aspect is based on the wireless communication system according to the eleventh or twelfth aspect, and includes: a control signal reception unit for receiving from the wireless communication system which communicates with the terminal a control signal generated and transmitted using subcarrier information indicating a subcarrier belonging to one frequency to notify of at least one of a down link frequency band and an up link frequency band determined by the wireless communication system by assuming subcarriers having different frequencies; and a device setting unit for designating one frequency and bandwidth according to the control signal received by the control signal reception unit, and setting a terminal.

The wireless communication system according to the thirteenth aspect includes: a link setting unit for setting a link to a terminal; and a control signal transmission unit for dividing subcarriers having different frequencies into groups configured by a plurality of subcarriers, and notifying a terminal for which the link setting unit sets a link of one frequency by generating and transmitting a control signal according to group information indicating a group corresponding to at least one of a down link frequency band and an up link frequency band determined by setting the link.

The wireless communication system according to the fourteenth aspect includes: a scheduling unit for scheduling of selecting a terminal to communicate with from among the terminals; and a control signal transmission unit for dividing subcarriers having different frequencies into groups configured by a plurality of subcarriers, and notifying the terminal selected by the scheduling unit performing the scheduling by generating and transmitting a control signal according to group information indicating a group corresponding to at least one of the down link frequency band and an up link frequency band determined by performing the scheduling.

The terminal according to the fourth aspect is based on the wireless communication system of the thirteenth or fourteenth aspect includes: a control signal reception unit for dividing subcarriers having different frequencies into groups configured by a plurality of subcarriers and receiving from the wireless communication system communicating with the terminal a control signal generated and transmitted using group information indicating a group corresponding to one frequency to notify the terminal of at least one of the down link frequency band and the up link frequency band determined by the wireless communication system; and a device setting unit for designating a frequency and a bandwidth of one frequency according to the control signal received by the control signal reception unit and setting the terminal.

In the present invention, a terminal category is designated by the wireless communication system by a terminal transmitting terminal capability information associated with a terminal category or terminal category information indicating the terminal category, a link setting is performed between the system and the terminal on the basis of the designated terminal category, and a control signal (information) corresponding to the link setting is transmitted to the terminal. The link setting (frequency setting in wireless communications) is performed with a possible setting range for one or more setting items associated with the terminal category restricted. With the restriction, the frequency setting can be simplified. Therefore, the frequency setting itself can be performed in a higher speed. It holds true with the frequency setting accompanied with the scheduling. The terminal capability information indicates the contents of at least one of the setting items, and can be, for example, at least one of a frequency bandwidth that can be received by the terminal (transmitting frequency bandwidth) and a frequency bandwidth that can be transmitted by the terminal (receiving frequency bandwidth), or a difference between the frequencies that can be transmitted and received by the terminal (difference between the transmitting frequency and the receiving frequency).

According to the present invention, when the link setting between the system and the terminal or the frequency setting by the scheduling is performed, a control signal (information) is generated using one of the down link frequency indicating the down link frequency band and the up link frequency indicating the up link frequency band determined by the frequency setting, and the other represented by the frequency difference between the down link frequency and the up link frequency, and the signal is transmitted to the terminal. The number of bits required to represent the frequency difference can be smaller than the number of bits required to represent the up link frequency or the down link frequency. Therefore, the number of bits for the control signal (information) can be smaller. Thus, the frequency setting can be easily performed at a higher speed.

It is also true in the case where at least one of the down link frequency indicating the down link frequency band and the up link frequency indicating the up link frequency band determined by a frequency setting is notified by generating a control signal (information) using reference frequency information indicating a reference frequency predetermined as a reference and a frequency difference between the reference frequency and the one of the frequencies, and transmitting the signal to the terminal, and in the case where it is notified by generating a control signal (information) using a frequency difference between at least one of the down link frequency and the up link frequency and a predetermined reference frequency as a reference, and transmitting the signal to the terminal.

According to the present invention, when a link is set or a frequency is set by performing scheduling, one of the down link frequency indicating the down link frequency band or the up link frequency indicating the up link frequency band determined by the frequency setting using subcarriers having different frequencies is notified by generating a control signal (information) using subcarrier information (for example, a number assigned to a subcarrier) indicating a subcarrier belonging to the one frequency and transmitting the signal to the terminal. By preparing the information designating the correspondence between the subcarrier information and the frequency, the corresponding frequency can be easily designated from the subcarrier information. The subcarrier information itself can be represented generally by a smaller number of bits than the case where the determined frequency is notified as a control signal (information). Therefore, a control signal (information) can come from a smaller number of bits, thereby easily realizing a high-speed frequency setting.

According to the present invention, when a link is set or a frequency is set by performing scheduling, subcarriers having different frequencies are divided into groups configured by a plurality of subcarriers, and the wireless terminal device that has set the frequency is notified of at least one of the determined down link frequency band and up link frequency band by generating a control signal (information) using group information indicating a group corresponding to the one frequency and transmitting the signal. Each of the frequency bandwidth and the position of the bandwidth (frequency) are determined for each group. Therefore, by preparing the information about the corresponding frequency bandwidth and the position of the bandwidth for each group, the frequency bandwidth and its position can be designated from the group information. This implies that the number of pieces of the information to be notified to the terminal is reduced. Without grouping in detail, the number of bits required to represent the group information can be largely reduced than in transmitting a notification by a control signal (information). Thus, it is easier than setting a frequency at a higher speed.

BRIEF DESCRIPTION OF THE DRAWINGS

FIG. 1 is an explanatory view of frequency information conventionally transmitted and received between a base station and a terminal;

FIG. 2 is an explanatory view of a frequency difference for each frequency band;

FIG. 3 is an explanatory view of a conventional categorizing process in the HSDPA (high-speed downlink packet access) system;

FIG. 4 is an explanatory view of a conventional categorizing process in the HSUPA (high-speed uplink packet access) system;

FIG. 6 illustrates the configuration of the wireless communication device mounted in a terminal capable of using the wireless communication system according to the first embodiment of the present invention;

FIG. 7 illustrates the configuration of the device setting control unit of the wireless communication device mounted in a terminal capable of using the wireless communication system according to the first embodiment of the present invention;

FIG. 9 illustrates the configuration of the link setting unit the wireless communication device mounted in a base station configuring the wireless communication system according to the first embodiment of the present invention;

FIG. 10 is an explanatory view of the terminal capability information associated with the terminal category according to the first embodiment of the present invention;

FIG. 11 illustrates the configuration of a variation of the wireless communication device mounted in a terminal capable of using the wireless communication system according to the first embodiment of the present invention;

FIG. 14 illustrates the configuration of the wireless communication device wireless communication device mounted in a terminal capable of using the wireless communication system according to the fourth embodiment of the present invention;

FIG. 17 is an explanatory view of grouping a subcarrier;

FIG. 18 is an explanatory view of a variation of the terminal capability information associated with the terminal category according to the first embodiment of the present invention.

BEST MODE FOR CARRYING OUT THE INVENTION

The embodiments of the present invention are described below in detail with reference to the attached drawings.

First Embodiment

Figure 5:
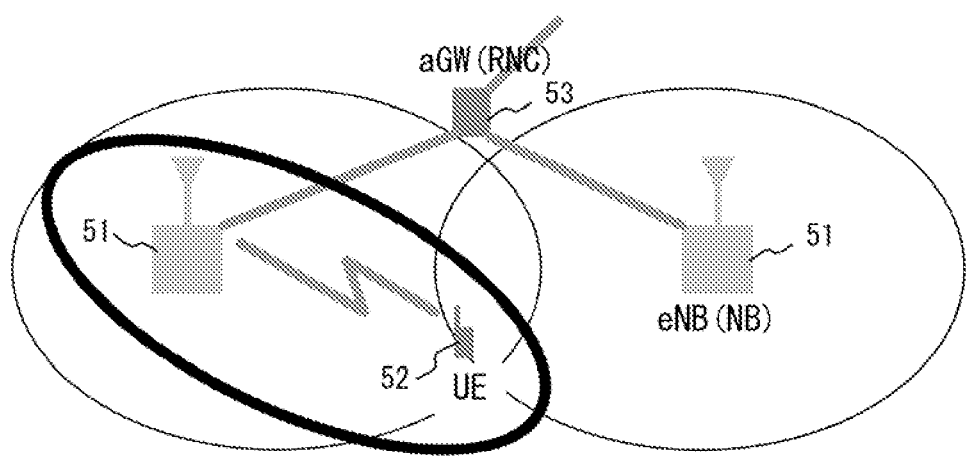
FIG. 5 illustrates a configuration of a wireless communication system according to the first embodiment of the present invention.

FIG. 5 illustrates a configuration of a wireless communication system according to the first embodiment of the present invention. The wireless communication system corresponds to, for example, the E3G system, that is, realizes a mobile communication service corresponding to the OFDMA (orthogonal frequency division multiple access). As illustrated in FIG. 5, a plurality of wireless base stations (node B hereinafter referred to simply as a "base station") for communicating with a mobile terminal device (UE (user equipment) hereinafter referred to simply as a "terminal") are provided to control the terminal 52 by a radio network controller (RNC) 53.

FIG. 6 illustrates the configuration of the wireless communication device mounted in the terminal. As illustrated in FIG. 6, the wireless communication device includes: an antenna 61, two wireless units 62 and 63, a coding/modulating unit 64, a demodulating/decoding unit 65, a terminal capability information storage unit 66 storing terminal capability information, a terminal information signal generation unit 67, a control signal extraction unit 68, and a device setting control unit 69. Hereafter, it is represented with "66" to clarify the storage for the terminal capability information.

The transmission data to be transmitted is encoded and modulated by the coding/modulating unit 64. An RF signal obtained by the modulation is transmitted from the antenna 61 through the wireless unit 62.

On the other hand, only the signal portion of the down bandwidth selected by the wireless unit 63 of the RF signal received by the antenna 61 is extracted, and transmitted to the demodulating/decoding unit 65. The demodulating/decoding unit 65 demodulates and decodes the RF signal from the wireless unit 63, and the obtained data is output as received data.

FIG. 7 illustrates the configuration of the device setting control unit. As illustrated in FIG. 7, the device setting control unit 69 includes a modulation/demodulation method and coding/decoding method calculation unit 71, a transmission/reception frequency calculation unit 72, a transmission/reception bandwidth calculation unit 73, a demodulating method and decoding method setting unit 74, a receiving use frequency setting unit 75, a receiving use bandwidth setting unit 76, a transmitting use bandwidth setting unit 77, a transmitting use frequency setting unit 78, and a modulating method and coding method setting unit 79.

Figure 8:
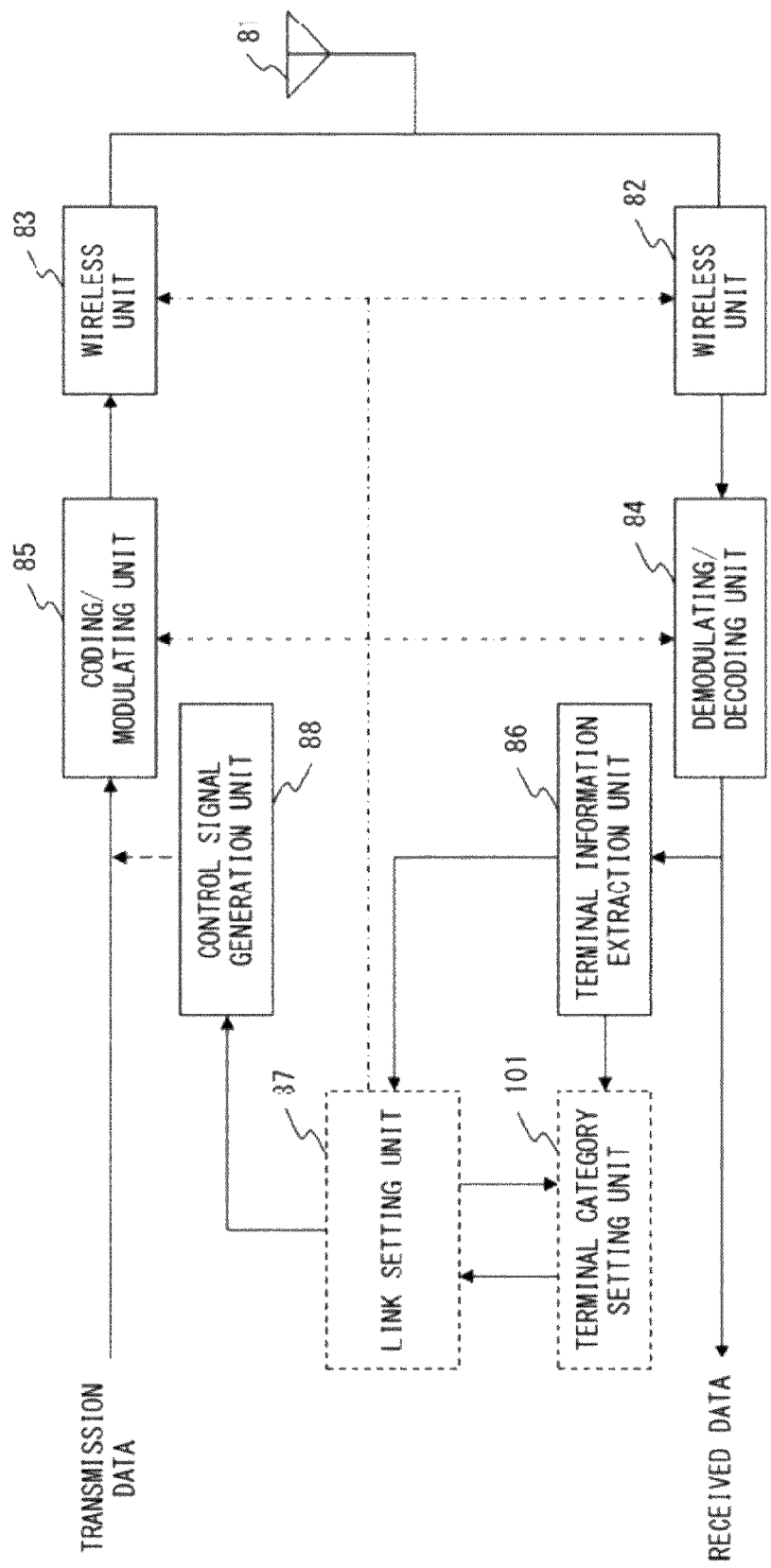
FIG. 8 illustrates the configuration of the wireless communication device mounted in a base station configuring the wireless communication system according to the first embodiment of the present invention.

FIG. 8 illustrates the configuration of the wireless communication device mounted in the base station. As illustrated in FIG. 8, the condition device includes an antenna 81, two wireless units 82 and 83, a demodulating/decoding unit 85, a coding/modulating unit 84, a terminal information extraction unit 86, and a control signal generation unit 88. A link setting unit 87 and a terminal category setting unit 101 are prepared at the base station 51 (at the wireless communication system), but can be mounted in any of the base station 51 and the radio network controller 52. The wireless communication system according to the present embodiment can be realized by preparing the wireless communication device illustrated in FIG. 8.

The transmission data to be transmitted is encoded and modulated by the coding/modulating unit 85. An RF signal obtained by the modulation is transmitted from the antenna 81 through the wireless unit 83

On the other hand, the RF signal received by the antenna 81 is extracted by the wireless unit 83 for each of the frequency bandwidth, and transmitted to the demodulating/decoding unit 84. The demodulating/decoding unit 84 demodulates and decodes the RF signal from the wireless unit 83. The obtained data is output as received data.

FIG. 9 illustrates the configuration of the link setting unit. As illustrated in FIG. 9, the link setting unit 87 includes a modulation/demodulation method and coding/decoding method calculation unit 91, a transmission/reception frequency calculation unit 92, a transmission/reception bandwidth calculation unit 93, a modulating method and coding method setting unit 94, a transmitting use frequency setting unit 95, a transmitting use bandwidth setting unit 96, a receiving use bandwidth setting unit 97, a receiving use frequency setting unit 98, and a demodulating method and decoding method setting unit 99.

The terminal 52 is classified by a terminal category corresponding to the E3G. The actually used up link frequency bandwidth (hereinafter referred to as a "up bandwidth") and down link frequency bandwidth (hereinafter referred to as a "down bandwidth") can be separately set. Since the up link frequency band and the down link frequency band depend on their bandwidths, the information about the bands is required for each band in addition to the information about each bandwidth. Accordingly, as compared with the case where each bandwidth is constant, necessary control information increases, thereby complicating the control. In the present embodiment, the complicated control can be suppressed as follows. As the information about bands, the central frequency of the each band is conveniently assumed. The information can be varied if the frequency band can be designated. For example, it can be the minimum or maximum frequency.

FIG. 10 is an explanatory view of the terminal capability information associated with the terminal category according to the present embodiment of the invention.

In the present embodiment, as illustrated in FIG. 10, a modulation system, a down bandwidth, an up bandwidth, and a maximum frequency difference between the bands are determined with the terminal category associated. In the terminal 52, at least one of a modulation system, an up bandwidth, a down bandwidth, and the maximum frequency difference is prepared as the terminal capability information 66, and the information 66 is converted into transmission data (terminal information signal) by the terminal information signal generation unit 67, and transmitted to the base station 51 using a predetermined channel. In this example, the information illustrated in FIG. 10 is conveniently referred to as integrated terminal category information.

The number of contents of each piece of the associated information as illustrated in FIG. 10 is 2 for the modulation system, and 3 for each of the up/down bandwidth and the maximum frequency difference. Therefore, the terminal capability information 66 of the modulation system can be transmitted as 1-bit information. Other information can be transmitted as 2-bit information.

As illustrated in FIG. 7, the demodulating/decoding unit 65 includes a demodulation unit 65a and a decoding unit 65b. The coding/modulating unit 64 includes a modulation unit 64a and a coding unit 64b. The terminal capability information 66 is transmitted to each of the calculation units 71 through 73 configuring the device setting control unit 69. Thus, the modulation/demodulation method and coding/decoding method calculation unit 71 determines a demodulating method and a decoding method from the terminal capability information 66, controls the demodulation unit 65a and the decoding unit 65b through the demodulating method and decoding method setting unit 74, determines a modulating method and a coding method, and controls the modulation unit 64a and the coding unit 64b through the modulating method and coding method setting unit 79. Similarly, the transmission/reception frequency calculation unit 72 calculates the down link frequency (receiving use frequency (central frequency of available down link frequency band)) and the up link frequency (central frequency of available up link frequency band). The receiving use frequency setting unit 75 generates a setting signal of an oscillation frequency of the local oscillator in the wireless unit 63, and controls the wireless unit 63, by based on the calculation result of the down link frequency. Similarly, on the basis of the up link frequency calculation result, the transmitting use frequency setting unit 78 generates a setting signal of the oscillation frequency of the local oscillator in the wireless unit 62, and controls the wireless unit 62, by based on the calculation result of the up link frequency. The transmission/reception bandwidth calculation unit 73 calculates a down bandwidth and an up bandwidth from the control signal. On the basis of the calculated reception bandwidth, the receiving use bandwidth setting unit 76 calculates the setting signal of the filter of the wireless unit 63 and the filter in the demodulation unit 65a, and controls wireless unit 63 and the demodulation unit 65a. Furthermore, the setting signal of the FFT in the demodulation unit 65a is calculated, and the demodulation unit 65a is controlled. On the basis of the similarly calculated transmission bandwidth, the transmitting use frequency setting unit 78 calculates the setting signal of the firmware in the modulation unit 64a in the wireless unit 62, and controls the setting signal of the FFT unit in the modulation unit 64a and controls the modulation unit 64a.

As illustrated in FIG. 8, the terminal capability information 67 transmitted to the base station 51 through the terminal information signal generation unit 67 is received and demodulated and decoded, and output as received data by the demodulating/decoding unit 84. The terminal information extraction unit 86 extracts the terminal capability information 66 stored in the received data, and transmits the information to the terminal category setting unit 101. The setting unit 101 includes a storage unit storing integrated terminal category information as illustrated in FIG. 10. Therefore, by referring to the integrated terminal category information using the extracted terminal capability information 66, the terminal category to which the terminal 52 that has transmitted the terminal capability information 66 belongs is designated, and the result is notified to the link setting unit 87. The link setting unit 87 sets a link for the terminal 52 according to the notified terminal category, and generates a control signal by notifying the control signal generation unit 88 of the control information to be transmitted to the terminal 52, and transmits the signal.

As illustrated in FIG. 9, the coding/modulating unit 85 includes a modulation unit 85a and a coding unit 85b, and the demodulating/decoding unit 84 includes a demodulation unit 84a and a decoding unit 84b. The link setting unit 87 has basically the same configuration as the device setting control unit 69 illustrated in FIG. 7. The terminal category designated by the terminal category setting unit 101 is transmitted to each of the calculation units 91 through 93 configuring the link setting unit 87. Thus, the modulation/demodulation method and coding/decoding method calculation unit 91 determines a demodulating method and a decoding method from the terminal category, controls the modulation unit 85a and the coding unit 85b through the modulating method and coding method setting unit 94, determines the demodulating method and the decoding method, and controls the demodulation unit 84a and the decoding unit 84b through the demodulating method and decoding method setting unit 99. Similarly, the transmission/reception frequency calculation unit 92 determines a down link frequency (receiving use frequency (central frequency of available down link frequency band)) and an up link frequency (transmitting use frequency (central frequency of available uplink frequency band)), thereby controlling the wireless unit 83 through the transmitting use frequency setting unit 95, and controlling the wireless unit 82 through the receiving use frequency setting unit 98. The transmission/reception bandwidth calculation unit 93 determines the down bandwidth and the up bandwidth, thereby controlling the wireless unit 93 and the modulation unit 85a through the transmitting use bandwidth setting unit 96, and controlling the wireless unit 82 and the demodulation unit 84a through the receiving use bandwidth setting unit 97.

Each of the calculation units 91 through 93 notifies the control signal generation unit 88 of the information about the determined contents as control information. Thus, the control information necessary for communications is transmitted to the terminal 52.

As illustrated in FIG. 7, the control information transmitted from the base station 51 is received, demodulated and decoded, and output as received data from the demodulating/decoding unit 65. The control signal extraction unit 68 extracts the control information stored in the received data and transmitted to the device setting control unit 69. Thus, after receiving the control information, the device setting control unit 69 controls each unit according to the control information.

As described above, according to the present embodiment, a terminal category is associated with information not originally included, and the associated information is reflected by the link setting. The contents of the associated information are limited to the scope of the classification by the terminal category. Therefore, the management of the terminal can be more easily performed, and the control can be simplified. As a result, frequency setting such as link setting etc. can be performed at a higher speed.

In the present embodiment, the terminal capability information 66 is transmitted to the base station 51, but a terminal category can be notified instead of the terminal capability information 66. The notification can be realized by, as illustrated in FIG. 11, preparing a terminal category setting unit 111 for designating and setting a terminal category from the terminal capability information 66, and controlling the terminal information signal generation unit 67 and the device setting control unit 69.

A number of combinations of up/down bandwidths is large. For example, when 1.25 MHz, 2.5 MHz, and 5.0 MHz are assumed as up bandwidths, 5.0 MHz, 10 MHz, and 20 MHz are assumed as down bandwidths, and down 20 MHz and up 5 MHz are assumed as the bandwidth of the entire system, the following 63 combinations can be assumed in the 2 GHz.

$$4\times(4+2+1)+2\times(4+2+1)+1\times(4+2+1)=9\times7=63$$

In Japan, as illustrated in FIG. 2, there are three available frequency bands. Therefore, with the number of bands taken into account, the number of combinations is 189 (63×3). When categorizing process is performed to realize all combinations, the number of categories is too large, and the management is complicated, thereby incurs an increasing number of pieces of necessary control information. To avoid this, the present embodiment suppresses the number of categories as illustrated in FIG. 10. In the equation above, "4", "2", and "1" respectively indicate that there can be four positions at 1.25 MHz, two positions at 2.5 MHz, and one position at 5.0 MHz in the up bandwidth, for example.

MIMO is one of the wireless techniques. The MIMO is short for multiple input multiple output, and data is transmitted/received through a plurality of antennas. Thus, as the information associated with a terminal category, as illustrated in FIG. 8, at least one of the MIMO transmission information indicating whether or not the transmission using the MIMO can be performed and the MIMO reception information indicating whether or not the reception using the MIMO can be performed can be added as MIMO information. Otherwise, it can be added for other type of information.

Second Embodiment

In the mobile communications, a mobile object (terminal) can move into an area covered by a different base station. To cope with the movement, handover is carried out. When the handover is performed, at least one assignment of the frequency resources, that is, up/down frequencies, and their bandwidths can be changed. The second embodiment suppresses the number of bits of the control information transmitted and received to change the assignment of the frequency resources during the handover.

During the handover, a terminal has already communicated with one or more base stations. That is, the up/down frequencies and their bandwidths have already been assigned. With the situation taken into account, the second embodiment is designed to reduce the necessary number of bits for control information and shorten the time required to transmit the control information.

The configurations of the terminal and the base station according to the second embodiment are basically the same as in the first embodiment. Therefore, the same or basically the same components as in the first embodiment are assigned the same reference numerals, and only components different from those in the first embodiment are described below in detail.

Figure 12:
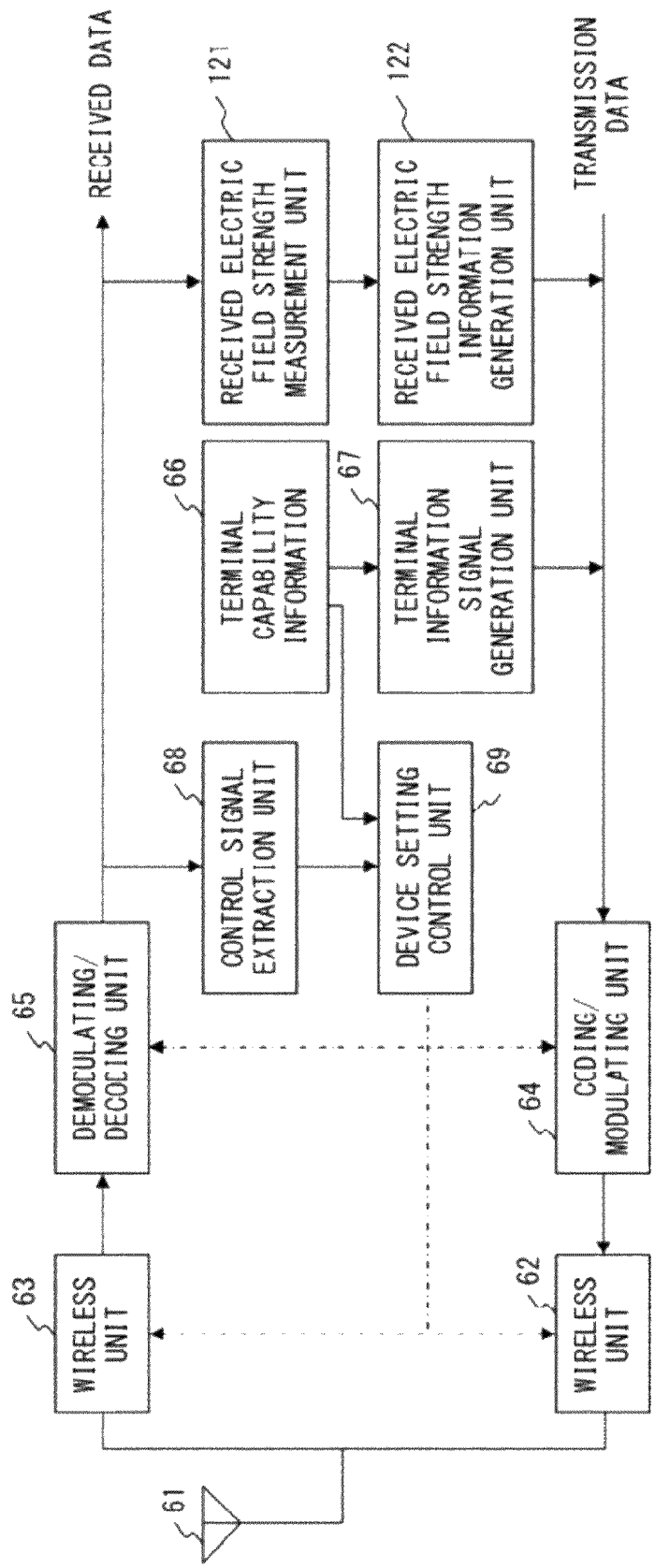
FIG. 12 illustrates the configuration of the wireless communication device mounted in a terminal capable of using the wireless communication system according to the second embodiment of the present invention.

FIG. 12 illustrates the configuration of the wireless communication device mounted in the terminal according to the second embodiment. As illustrated in FIG. 12, further provided in addition to the configuration according to the first embodiment are: a received electric field strength measurement unit 121 for measuring the received electric field strength from the received data for each base station 51; and a received electric field strength information generation unit 122 for notifying the base station 51 of the measurement result by the measurement unit 121. The generation unit 122 transmits the measurement result to the base station 51 as the received electric field strength information. The wireless terminal device according to the second embodiment is realized by mounting in the terminal 52 the wireless communication device illustrated in FIG. 12. It is the same in other embodiments described later.

Figure 13:
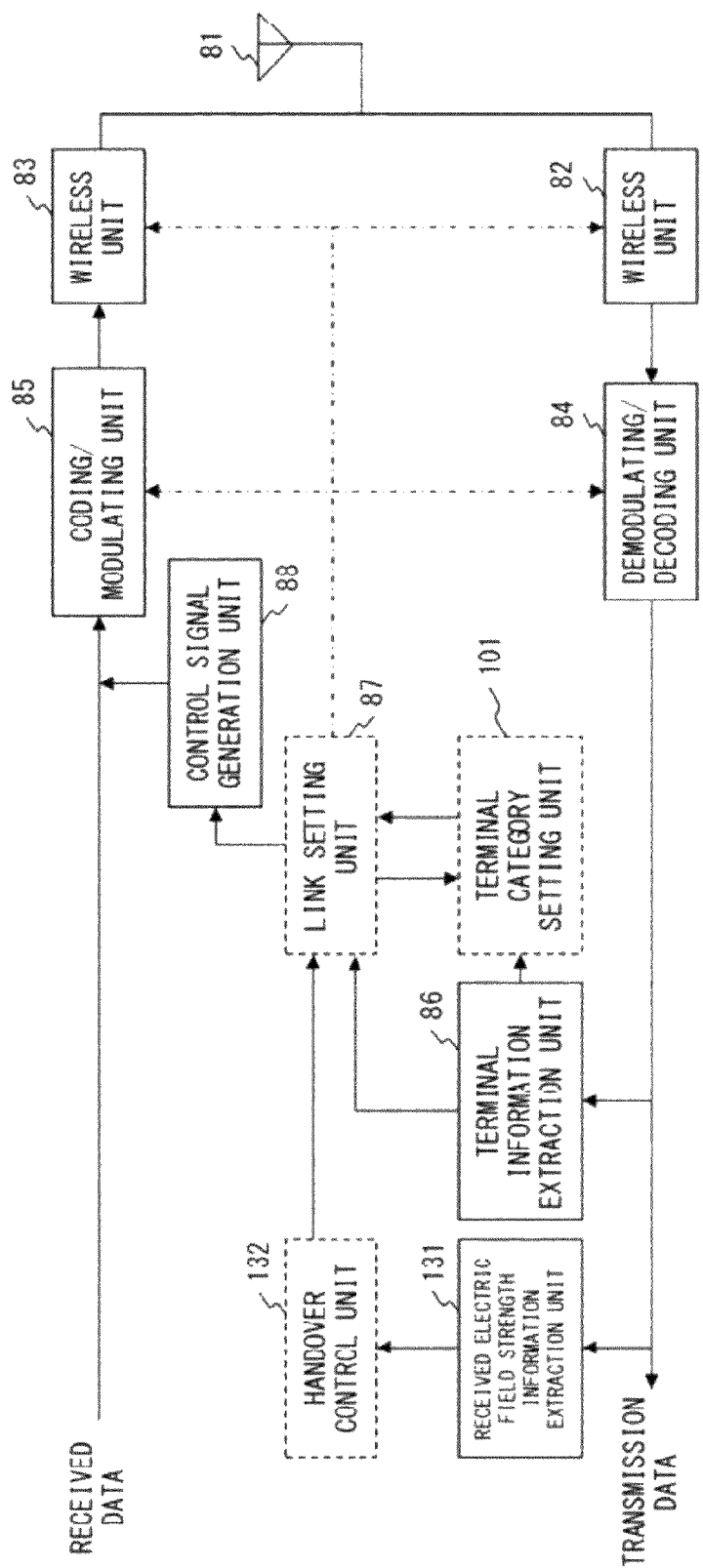
FIG. 13 illustrates the configuration of the wireless communication device mounted in a base station configuring the wireless communication system according to the second embodiment of the present invention.

On the other hand, as illustrated in FIG. 13, in addition to the configuration according to the first embodiment, the base station 51 is provided with: a received electric field strength information extraction unit 131 for extracting the received electric field strength information received from the terminal 52 from received data; and a handover control unit 132 for determining the necessity to perform handover according to the received electric field strength information extracted by the extraction unit 131.

The handover control unit 132 is provided for the base station 51 or the radio network controller 53. By referring to the received electric field strength information transmitted for each base station 51, the necessity of the handover is determined, and the determination result is notified to the link setting unit 87. On the basis of the notification, the base station 51 having the largest received electric field strength is allowed to communicate with the terminal 52. Upon receipt of the notification of the necessity of the handover, the link setting unit 87 sets a link to the terminal 52 to communicate with, designates a terminal category according to the terminal capability information 66 about the terminal 52, and sets the link. If the contents of the link setting are different from the preceding contents, the control information to be transmitted to the terminal 52 is transmitted to the control signal generation unit 88, and a control signal is transmitted.

The following control signal is transmitted.

When the identification about the down link frequency is Nd, the down link frequency information Nd is generated by the equation (2) above.

Similarly, when the information about the up link frequency is Nu, the up link frequency information Nu is generated by the following equation using the down link frequency $F_{DL}$ and the determined up link frequency $F_{UL}$ $$Nu=5\times(F_{DL}-F_{UL}) \qquad (5)$$

The down link frequency information Nd requires 14 bits as described above. However, since the up link frequency information Nu is calculated by the following equation although the up/down link frequency differences are UMTS 1.7/2.1 of the frequency band number iv at the largest up/down link frequency difference of 490 MHz as illustrated in FIG. 2, the information can be represented by 12 bits.

$$Nu=5\times490=2450$$

Therefore, as compared with the case where the up link frequency information Nu is generated using the equation (2) above, the number of bits can be reduced. By the reduction, the frequency setting accompanied with the link setting etc. can be performed at a high speed. Each piece of the up link frequency information Nu and Nd is calculated by the transmission/reception frequency calculation unit 92.

Each piece of the up link frequency information Nu and Nd is transmitted as a control signal to the terminal 52, and extracted by the control signal extraction unit 68. The device setting control unit 69 calculates the up link frequency $F_{UL}$ from the up/down link frequency information Nu and Nd, and then calculates the down link frequency $F_{DL}$. Thus, a setting is performed according to the control signal transmitted from the base station 51. The calculation of the frequencies $F_{UL}$ and $F_{DL}$ is performed by the transmission/reception frequency calculation unit 72 illustrated in FIG. 7.

In the present embodiment, the information generated using the equation (5) is transmitted as the down link frequency information Nd with the up link frequency information Nu, but the inverse operation is acceptable. That is, the up link frequency information Nu is generated using the equation similar to the equation (2), and the down link frequency information Nd can be generated using the equation similar to the equation (5). In addition, it is also possible for a base station to determine one of the up and down frequencies, notifies the 52 of the determination, and the terminal 52 can determine the other with reference to the integrated terminal category information as illustrated in FIG. 10 and transmit a notification.

Third Embodiment

In the above-mentioned first and second embodiments, at least one of the up and down frequencies is notified directly from the base station 51 to the terminal 52. In the third embodiment, at least one of the up and down frequencies is predetermined as a reference, and the up and down frequencies are notified using the determined frequency of the reference so that the necessary number of bits for transmitting control information (signal) can be smaller.

The configurations of the terminal and the base station according to the third embodiment are basically the same as in the first embodiment. Therefore, the same or basically the same components as in the first embodiment are assigned the same reference numerals, and only components different from those in the first embodiment are described below in detail. In this example, as illustrated in FIG. 2, the up/down link frequency bands and the frequency difference between the bands are predetermined.

In the link setting unit 87 of the base station 51, the down link frequency to be assigned to the terminal 52 is determined with the link use status etc. taken into account. In this case, a control signal is generated using at least one of a predetermined frequency band number or its central frequency and a difference between the central frequency and an actually determined up and down link frequency. Since the central frequency is used as a reference, it is hereinafter referred to as a "reference frequency".

The frequency band numbers 1 through 9 can be represented by 4 bits. The difference between the reference frequency and the up link frequency can be represented by 8 bits although 70 MHz is used as the maximum system bandwidth. In this example, the reference frequency is expressed by $f_{S\_DL}$, the determined down link frequency by $f_{DL}$, the down link frequency information indicating the difference between the frequencies by Nd, and the frequency information Nd is generated using the following equation.

$$Nd=2\times(f_{S\_DL}-f_{DL}) \qquad (6)$$

Thus, the control information indicating the down link frequency can be represented by a total of 12 bits. Therefore, the control information can be transmitted by a smaller number of bits. As a result, it can be set at a speed higher than the frequency setting.

Actually, if a down link frequency band is determined on the basis of UMTS 800 (frequency band number vi) with the central frequency of 877.5 MHz, and the control information is generated using 2.5 MHz as a difference from 877.5 MHz with the reference frequency of 880 MHz as the central frequency, then the band number is "0110" as 6, and 2.5 MHz is "000000101" by the equation (6), and the result is "0110000000101".

In the present embodiment, the control information is generated on the basis of the band number+the difference of reference frequency, but the order can be inverse. Although the difference is obtained between the reference frequency and the down link frequency, it can be obtained between the reference frequency and the up link frequency. The difference can be generated using the following equation where Nu indicates the frequency information, $f_{S\_UL}$ indicates the up reference frequency, and $f_{UL}$ indicates the determined up link frequency.

$$Nu=2\times(f_{S\_UL}-f_{UL}) \qquad (7)$$

Since the necessary number of bits can be reduced for the frequency information Nd and Nu, any of them can be transmitted. The number of reference frequency band or the reference frequency can be stored in advance in a storage device.

Fourth Embodiment

In the mobile (wireless) communication, it is common that a scheduling process is performed by selecting a destination and determining a transmitting method. The fourth embodiment is designed to devise the scheduling.

The configurations of the terminal and the base station according to the fourth embodiment are basically the same as in the first embodiment. Therefore, as with the second and third embodiments, the same or basically the same components as in the first embodiment are assigned the same reference numerals, and only components different from those in the first embodiment are described below in detail.

FIG. 14 illustrates the configuration of the wireless communication device mounted in the terminal according to the fourth embodiment. As illustrated in FIG. 14, in addition to the configuration according to the first embodiment, the device further includes a CQI (channel quality indicator) measurement unit 141 for measuring transmission power and interference power upon receipt of a pilot signal transmitted from the base station 51, calculating a SIR, and measuring a CQI information, and a CQI generation unit 142 for transmitting the measurement result to the base station 51. The CQI generation unit 142 transmits the measurement result of the CQI information as CQI information to the base station 51. It is transmitted on the HS-DPCCH (dedicated physical control channel (uplink) for HS-DSCH).

Figure 15:
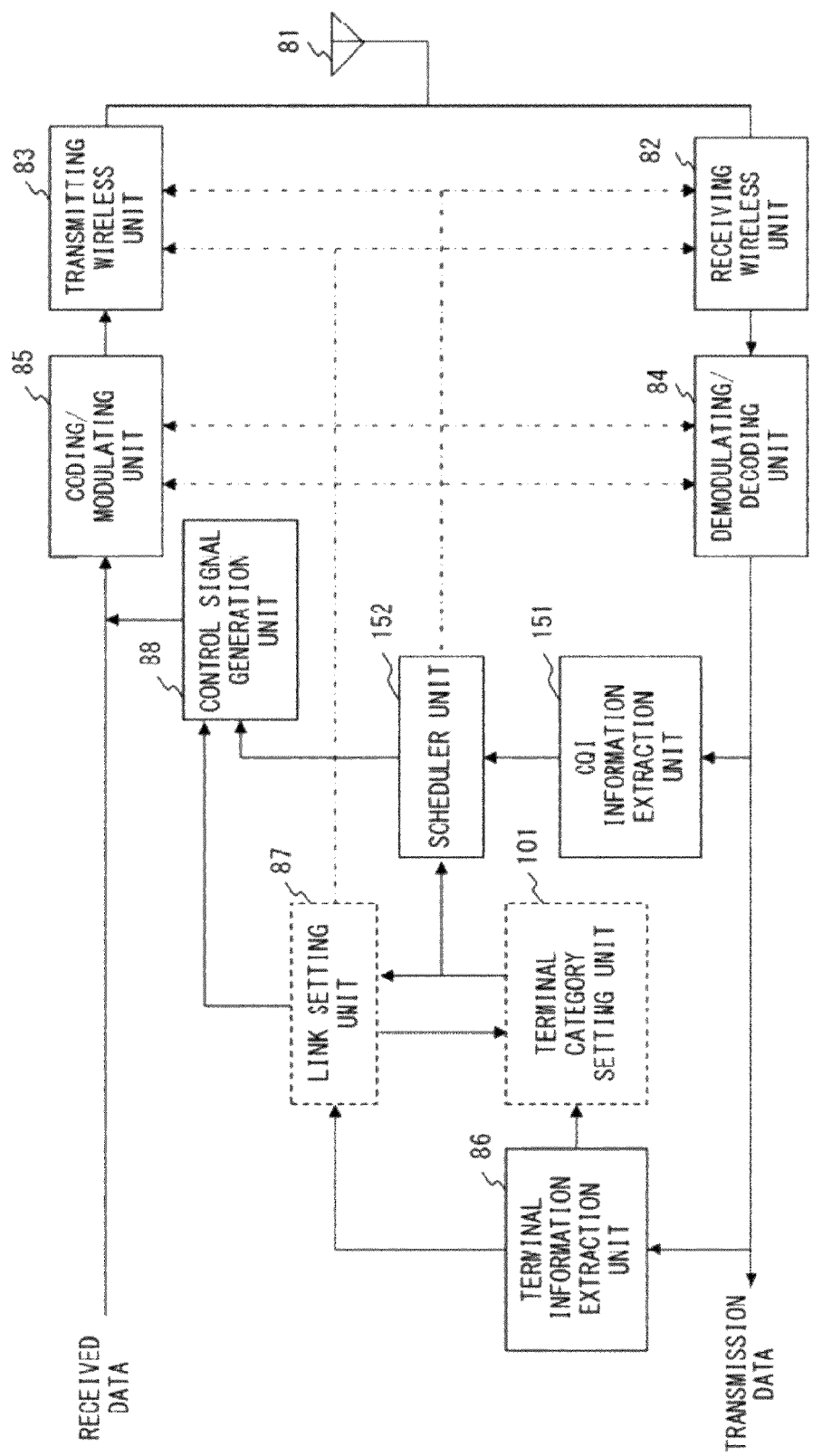
FIG. 15 illustrates the configuration of the wireless communication device mounted in a base station configuring the wireless communication system according to the fourth embodiment of the present invention.

On the other hand, as illustrated in FIG. 15, in addition to the configuration according to the first embodiment, the device further includes a CQI information extraction unit 151 for extracting the CQI information received from the terminal 52 from the received data, and a scheduler unit 152 for performing scheduling according to the CQI information extracted by the extraction unit 151.

The scheduler unit 152 selects the terminal 52 for transmission with reference to the CQI information extracted for each terminal 52 by the CQI information extraction unit 151, and selects a modulation system, a coding rate, a data length, a bandwidth, and an available frequency from a terminal category. The terminal category is notified as a terminal information signal from the terminal 52 to the base station 51, or notified from the terminal category setting unit 101 according to the terminal capability information 66 transmitted by the terminal 52. By transmitting the selection result to the control signal generation unit 88, the result is transmitted as a control signal to the corresponding terminal 52. To manage the terminal 52 by the terminal category (terminal capability information 66) as described above, as with the first embodiment, the control is simplified. The simplified process realize s a frequency setting at a higher speed.

Fifth Embodiment

In the OFDMA, as it is well known, all subcarriers are shared by all users (terminals 52), and a subcarrier having high transmission characteristic for each user is assigned, thereby improving the frequency use efficiency. The firth embodiment generates control information by regarding the subcarriers.

The configurations of the terminal and the base station according to the fifth embodiment are basically the same as in the first embodiment. Therefore, as with the second through fourth embodiments, the same or basically the same components as in the first embodiment are assigned the same reference numerals, and only components different from those in the first embodiment are described below in detail.

Figure 16:
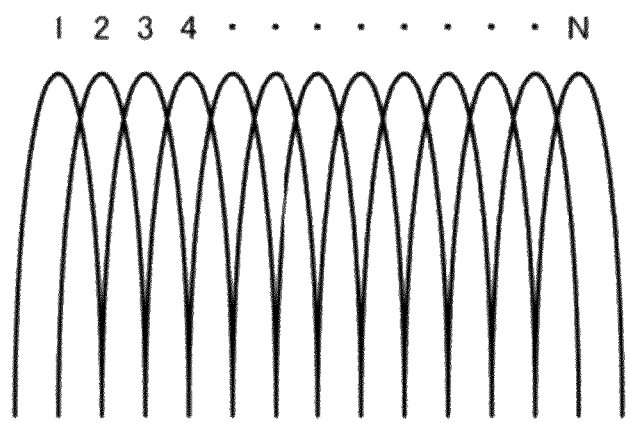
FIG. 16 illustrates an example of numbering to the subcarriers.

FIG. 16 illustrates an example of numbering to the subcarriers. In the present embodiment, as illustrated in FIG. 16, a subcarrier having a lower frequency is assigned a smaller number. The number assigned to a subcarrier having the lowest frequency is 1. In this example, it is assumed that the base station 51 and the terminal 52 share a subcarrier numbers, the frequency of the subcarrier associated with each number, and a subcarrier bandwidth.

The link setting unit 87 at the base station 51 refers to the integrated terminal category information (FIG. 10) using a terminal category designated by the terminal capability information 66 received from the terminal 52, and determines up and down bandwidths to be assigned, up and down frequencies, etc., that is, a group. In this case, for example, the number of subcarrier positioned at the center of the group from the determined down link frequency, and designates the number of subcarriers from the down bandwidth. The designation of the subcarrier number and the number of subcarriers is similarly performed for the up link frequency and the up bandwidth. The thus designated subcarrier number and number of subcarriers are notified and transmitted as control information to the control signal generation unit 88. The designation of the subcarrier number is performed by the transmission/reception frequency calculation unit 92, and the designation of the number of subcarriers is performed by the transmission/reception bandwidth calculation unit 93.

On the other hand, the control signal extraction unit 68 of the terminal 52 extracts the control information (signal) received from the base station 51 from the received data, and notifies the device setting control unit 69 of the information. The subcarrier number and the number of subcarriers in the control signal are transmitted to the transmission/reception frequency calculation unit 72 and the transmission/reception bandwidth calculation unit 73 respectively. Thus, the transmission/reception frequency calculation unit 72 calculates the frequency corresponding to the subcarrier number, and the transmission/reception bandwidth calculation unit 73 calculates the bandwidth corresponding to the number of subcarriers.

The subcarrier number and the number of subcarriers are recognized as control information (signal) so that the resources can be arbitrarily assigned to each subcarrier. The necessary number of bits in representing the subcarrier number and number of subcarriers depends on the total number of subcarriers. However, since the frequency and the bandwidth can be separately managed by the subcarrier number and the number of subcarriers, control can be easily performed. Thus, the frequency setting can be performed at a high speed.

In the present embodiment, the combination of the subcarrier number and the number of subcarriers is transmitted as a control signal, but another combination is available. For example, the frequency can replace the subcarrier number. Otherwise, as in the third embodiment, a reference frequency is predetermined, and a difference from the reference frequency can be adopted. In addition, as illustrated in FIG. 17, a plurality of subcarriers can be grouped, each group is assigned a unique number, and a combination of a subcarrier number and a group number can be transmitted as a control signal. Since the frequency bandwidth assigned to each group and the position on the frequency axis are normally unique, only the group number can be transmitted as a control signal. Although only the group number is notified, the frequency bandwidth and the information for designation of the position can be prepared at the terminal 52 for each group, thereby allowing the terminal 52 to designate the corresponding frequency bandwidth and the position according to the group information. Thus, the information adopted as a control signal can come in variations. The control signal can be transmitted during link setting, and also can be transmitted when a transmission terminal is determined by scheduling.

Sixth Embodiment

In the mobile communications, a cell can be selected during link setting and during handover, and synchronization can be performed during standby using the central frequency of a bandwidth available in a base station. In this case, a predetermined frequency (for example, the central frequency of a system frequency band hereinafter referred to as a "initial use frequency") is used for a CPICH (common pilot channel) for transmitting a common pilot signal from a base station, a SCH (synchronization channel) for transmitting a synchronization signal, a PCH (paging channel) for transmitting a standby signal, a BCH (broadcast channel) for transmitting system information, and a PICH (paging indicator channel) for notifying the presence/absence of a received signal. A predetermined bandwidth (hereinafter referred to as a "initial use frequency band") is used for a transmission from a base station to a terminal. The sixth embodiment is designed to generate control information with the consideration above.

The configurations of the terminal and the base station according to the sixth embodiment are basically the same as in the first embodiment. Therefore, as with the second through fifth embodiments, the same or basically the same components as in the first embodiment are assigned the same reference numerals, and only components different from those in the first embodiment are described below in detail.

The frequency and the bandwidth used in transmitting each of the above-mentioned signals are transmitted from the base station 51 to the terminal 52 using the PCH etc. The transmission is performed by generating a control signal as described above with reference to the second embodiment. The initial use frequency and the initial use bandwidth can be stored at the terminal in advance.

Figure 19:
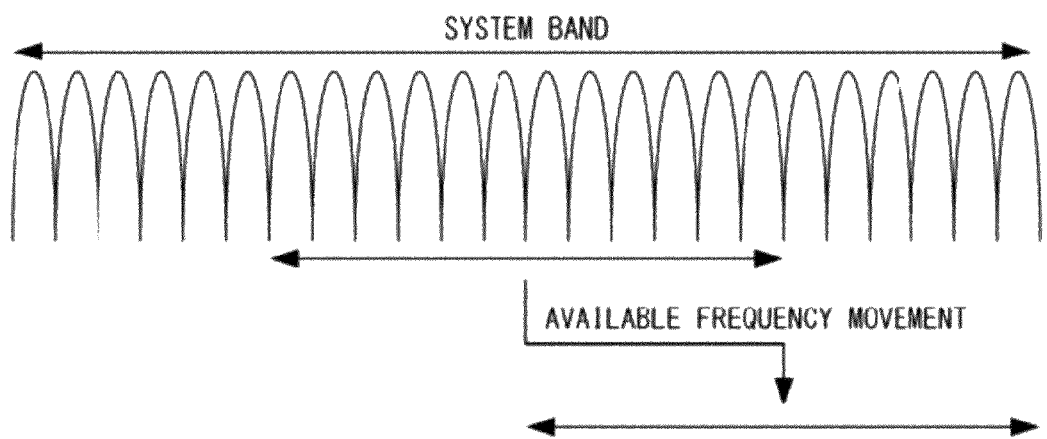
FIG. 19 is an explanatory view of the state in which an available frequency band is moved.

When a frequency band is moved after establishing a wireless channel, the central frequency of a frequency band is used in transmitting the signal before the movement. In the sixth embodiment, a control signal is generated and transmitted by using the central frequency as a reference frequency as in the third embodiment. Thus, a frequency can be easily set at a high speed by reducing the necessary number of bits for a control signal. FIG. 19 is an explanatory view of the state in which an available frequency band is moved.

In the present embodiments (first through sixth embodiments), the link setting unit 87 and the scheduler unit 152 at the base station (wireless communication system) and the device setting control unit 69 of the terminal 52 are realized by a CPU for executing a program or a DSP etc. In some existing wireless communication systems or terminals, the present invention can be applied by changing the program executed by a CPU, a DSP, etc. Thus, a program for realizing the wireless communication system or the terminal according to the present invention can be prepared, and the program can be recorded on a record medium such as flash memory, CD-ROM, etc. and then distributed. It can be distributed through a communication network.

The invention claimed is:

1. A wireless communication system comprising:
a processor circuit configured
to receive and extract terminal capability information, the terminal capability information indicating at least one of an uplink frequency bandwidth and a downlink frequency bandwidth as a capability of a wireless terminal device,
to identify a terminal category to which the wireless terminal device belongs, based on the terminal capability information, and
to set a link between a base station and the wireless terminal device; and
a transmitter configured to transmit a control signal depending on the link setting between the base station and the wireless terminal device, based on the set terminal category.

2. A wireless communication system comprising:
a processor circuit configured
to receive and extract terminal capability information, the terminal capability information indicating at least one of an uplink frequency bandwidth as a capability of a wireless terminal device and a downlink frequency bandwidth as a capability of the wireless terminal device,
to identify a terminal category to which the wireless terminal device belongs, based on the terminal capability information; and
a scheduler configured to schedule on a basis of the terminal category set by the processor circuit for selecting a wireless terminal device to communicate with from among wireless terminal devices.

3. A wireless communication system comprising:
a processor circuit configured
to receive and extract terminal capability information, the terminal capability information indicating at least one of an uplink frequency bandwidth as a capability of a wireless terminal device and a downlink frequency bandwidth as a capability of the wireless terminal device, and
to set a link between a base station and the wireless terminal device according to the terminal capability information; and
a transmitter configured to transmit a control signal corresponding to the link setting between the base station and the wireless terminal device.

4. A wireless communication system comprising:
a processor circuit configured to receive and extract terminal capability information and indicating a terminal category to which a wireless terminal device belongs, the terminal capability information indicating at least one of an uplink frequency bandwidth as a capability of a wireless terminal device and a downlink frequency bandwidth as a capability of the wireless terminal device; and
a scheduler configured to schedule, according to the terminal capability information received and extracted by the processor circuit, a selection of a wireless terminal device to communicate with from among wireless terminal devices.

5. A wireless base station, comprising:
a processor circuit configured
to receive terminal capability information indicating at least one of an uplink frequency bandwidth as a capability of a wireless terminal device and a downlink frequency bandwidth as a capability of the wireless terminal device, and
to set a link between a base station and the wireless terminal device according to the terminal capability information; and
a transmitter configured to transmit a control signal corresponding to the link setting between the base station and the wireless terminal device.

6. A wireless base station, comprising:
a processor circuit configured to receive and extract terminal capability information and indicating a terminal category to which a the wireless terminal device belongs, the terminal capability information indicating at least one of an uplink frequency bandwidth as a capability of a wireless terminal device and a downlink frequency bandwidth as a capability of the wireless terminal device; and
a scheduler configured to schedule, according to the terminal capability information received and extracted by the processor circuit, a selection of a wireless terminal device to communicate with from among wireless terminal devices.

7. A wireless terminal device, comprising:
a processor circuit configured to identify a terminal category to which wireless terminal belongs, based on at least one of an uplink frequency bandwidth as a capability of a wireless terminal device and a downlink frequency bandwidth as a capability of the wireless terminal device; and
a transmitter configured to transmit the terminal category to a base station.

8. The wireless terminal device according to claim 7, further comprising:

a receiver configured to receive a control signal depending on a link setting between the base station and the wireless terminal device, based on said identified terminal category.

* * * * *